US012763923B2

(12) United States Patent
Matsushita et al.

(10) Patent No.: US 12,763,923 B2
(45) Date of Patent: Oct. 13, 2026

(54) INFORMATION PROCESSING APPARATUS, INFORMATION PROCESSING METHOD, AND COMPUTER READABLE MEDIUM

(71) Applicant: Mitsubishi Electric Corporation, Tokyo (JP)

(72) Inventors: Ryuma Matsushita, Tokyo (JP); Sachiko Taniguchi, Tokyo (JP); Takahisa Yamauchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 308 days.

(21) Appl. No.: 18/583,234

(22) Filed: Feb. 21, 2024

(65) Prior Publication Data

US 2024/0195600 A1 Jun. 13, 2024

Related U.S. Application Data

(63) Continuation of application No. PCT/JP2021/037669, filed on Oct. 12, 2021.

(51) Int. Cl.
*H04L 7/02* (2006.01)
*H04L 7/00* (2006.01)

(52) U.S. Cl.
CPC .............. *H04L 7/02* (2013.01); *H04L 7/0054* (2013.01)

(58) Field of Classification Search
CPC ................................ H04L 7/0054; H04L 7/02
USPC .......................................................... 370/503
See application file for complete search history.

(56) References Cited

U.S. PATENT DOCUMENTS 7,394,830 B2 * 7/2008 Chapman .............. H04J 3/0694 713/400
2016/0134387 A1 * 5/2016 Shibata ................. H04J 3/0667 370/503
2020/0104224 A1 4/2020 Katou
2020/0150159 A1 5/2020 Takeda et al.
(Continued)

FOREIGN PATENT DOCUMENTS

EP 4 109 788 A1 12/2022
EP 4109788 B1 * 7/2025 ............... H04L 7/02
(Continued)

OTHER PUBLICATIONS

Extended European Search Report for European Application No. 21960568.0, dated Oct. 14, 2024.
(Continued)

*Primary Examiner* — Peter G Solinsky
(74) *Attorney, Agent, or Firm* — Birch, Stewart, Kolasch & Birch, LLP

(57) ABSTRACT

An inference unit (1033) predicts as a prediction parameter value, a future parameter value of a time synchronization parameter used for time synchronization calculation which is calculation for synchronizing times of two devices. When a measured parameter value which is a measured value corresponding to the prediction parameter value is generated with elapse of time, a cumulative distribution table generation unit (1034) calculates as a prediction error, a difference between the measured parameter value and the prediction value. A cumulative probability calculation unit (1036) calculates an abnormality degree indicating possibility that an abnormality is included in the measured parameter value, using the prediction error.

17 Claims, 15 Drawing Sheets

(56) References Cited

U.S. PATENT DOCUMENTS

| | | | | |
|---|---|---|---|---|
| 2021/0065023 | A1 | 3/2021 | Naito et al. | |
| 2021/0076866 | A1 | 3/2021 | Grantcharov et al. | |
| 2021/0076966 | A1* | 3/2021 | Grantcharov .......... | G06N 20/00 |
| 2021/0097438 | A1 | 4/2021 | Matsumoto et al. | |
| 2023/0016860 | A1* | 1/2023 | Fan ........................ | H04J 3/0667 |

FOREIGN PATENT DOCUMENTS

| | | | |
|---|---|---|---|
| JP | 2005-69749 | A | 3/2005 |
| JP | 2017-216563 | A | 12/2017 |
| JP | 2018-112852 | A | 7/2018 |
| JP | 2020-52459 | A | 4/2020 |
| JP | 2020-52740 | A | 4/2020 |
| JP | 2021-56927 | A | 4/2021 |
| WO | WO 2018/230645 | A1 | 12/2018 |
| WO | WO 2021/196801 | A1 | 10/2021 |

OTHER PUBLICATIONS

IEEE, "IEEE Standard for Local and Metropolitan Area Networks—Timing and Synchronization for Time-Sensitive Applications", IEEE Std 802.1AS™-2020, 2020, total 421 pages.

International Search Report (PCT/ISA/210) issued in PCT/JP2021/037669, dated Dec. 28, 2021.

* cited by examiner

Fig. 10

(a) BEFORE UPDATE

| PREDICTION ERROR | CUMULATIVE FREQUENCY |
| --- | --- |
| 1 | 2 |
| 2 | 3 |
| 8 | 5 |
| 10 | 6 |

(b) INSERT NEW ROW

| PREDICTION ERROR | CUMULATIVE FREQUENCY |
| --- | --- |
| 1 | 2 |
| 2 | 3 |
| 7 | 4 |
| 8 | 6 |
| 10 | 7 |

COPY

+1

Fig. 11

(c) UPDATE OF EXISTING ROW

| PREDICTION ERROR | CUMULATIVE FREQUENCY |
|---|---|
| 1 | 2 |
| 2 | 3 |
| 7 | 4 |
| 8 | 7 |
| 10 | 8 |

+1

INFORMATION PROCESSING APPARATUS, INFORMATION PROCESSING METHOD, AND COMPUTER READABLE MEDIUM

CROSS REFERENCE TO RELATED APPLICATIONS

This application is a Continuation of PCT International Application No. PCT/JP2021/037669, filed on Oct. 12, 2021, which is hereby expressly incorporated by reference into the present application.

TECHNICAL FIELD

The present disclosure relates to a time synchronization technique to synchronize times between a plurality of devices.

BACKGROUND ART

There is a generalized Precision Time Protocol (gPTP) as a communication protocol for synchronizing times between devices via a network. The gPTP is defined in IEEE 802.1AS-2020. In the gPTP, a timestamp stamped by each device is exchanged between the devices, and a propagation delay between the devices, a clock ratio of the devices, and a retention time of a communication frame in the devices are measured. Then, in the gPTP, time synchronization is realized with accuracy of microseconds or less between the devices.

CITATION LIST

Patent Literature

Non-Patent Literature 1: IEEE 802.1AS-2020-IEEE Standard for Local and Metropolitan Area Networks—Timing and Synchronization for Time-Sensitive Applications

SUMMARY OF INVENTION

Technical Problem

However, a system that synchronizes times with high accuracy has a problem of high cost for analyzing an abnormality cause when a time synchronization abnormality occurs. Here, a parameter used for time synchronization calculation which is calculation for time synchronization, is referred to as a time synchronization parameter. A parameter value of the time synchronization parameter fluctuates on millisecond order due to fluctuation of a transmission period of the time synchronization parameter, a network delay, and the like. Therefore, the abnormality cannot be easily detected if the abnormality on order of microseconds or less is included in the parameter value of the time synchronization parameter.

The present disclosure mainly aims to solve a problem such as above. That is, the present disclosure mainly aims to obtain a configuration that facilitates detection of an abnormality included in a parameter value of a time synchronization parameter.

Solution to Problem

An information processing apparatus according to the present disclosure includes:

a parameter value prediction unit to predict as a prediction parameter value, a future parameter value of a time synchronization parameter used for time synchronization calculation which is calculation for synchronizing times of two devices;

a prediction error calculation unit, when a measured parameter value which is a measured value corresponding to the prediction parameter value is generated with elapse of time, to calculate as a prediction error, a difference between the measured parameter value and the prediction parameter value; and an abnormality degree calculation unit to calculate an abnormality degree indicating possibility that an abnormality is included in the measured parameter value, using the prediction error.

Advantageous Effects of Invention

According to the present disclosure, it is possible to facilitate detection of an abnormality included in a parameter value of a time synchronization parameter.

BRIEF DESCRIPTION OF DRAWINGS

FIG. 10 is a diagram illustrating a specific example of update of the cumulative distribution table according to Embodiment 1.

FIG. 11 is a diagram illustrating a specific example of update of the cumulative distribution table according to Embodiment 1.

DESCRIPTION OF EMBODIMENTS

Embodiments will be described hereinafter with reference to the drawings. In the following description of the embodiments and the drawings, portions denoted by the same reference signs indicate the same or corresponding portions.

Embodiment 1

Description of Configuration

Figure 1:
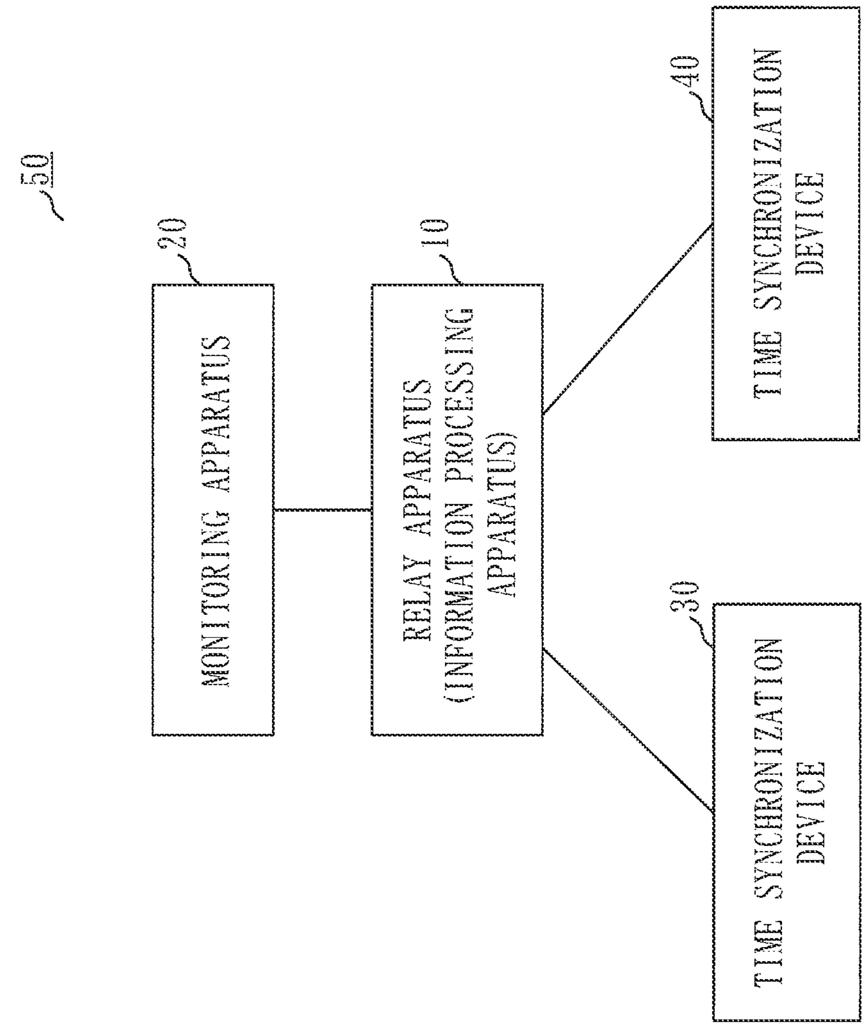
FIG. 1 is a diagram illustrating a configuration example of a time synchronization system according to Embodiment 1.

FIG. 1 illustrates a time synchronization system 50 according to the present embodiment.

The time synchronization system 50 according to the present embodiment includes a relay apparatus 10, a monitoring apparatus 20, a time synchronization device 30, and a time synchronization device 40.

The time synchronization device 30 and the time synchronization device 40 are devices that perform time synchronization.

Each of the time synchronization device 30 and the time synchronization device 40 performs time synchronization calculation, for example, according to a gPTP. Specifically, the time synchronization device 30 and the time synchronization device 40 notify the relay apparatus 10 of a value (a time) of a stamped timestamp. That is, the time synchronization device 30 and the time synchronization device 40 transmit to the relay apparatus 10, a communication frame that notifies the relay apparatus 10 of the time (the value of the timestamp) measured by each device. The time (the value of the timestamp) is one of time synchronization parameters. In addition to this, the time synchronization parameters are, for example, a propagation delay, a clock ratio, a retention time, and the like, to be described below. In the following, measured values of these time synchronization parameters are referred to as measured parameter values. On the other hand, prediction values of these time synchronization parameters are referred to as prediction parameter values.

The relay apparatus 10 is connected to the monitoring apparatus 20, the time synchronization device 30, and the time synchronization device 40, through a network. The relay apparatus 10 relays communication between the monitoring apparatus 20, the time synchronization device 30, and the time synchronization device 40. The relay apparatuses 10 in a plurality of tires may be configured between the monitoring apparatus 20, the time synchronization device 30, and the time synchronization device 40. That is, there may be another relay apparatus on a transmission path between the relay apparatus 10 and the time synchronization device 30. The other relay apparatus may not be a communication apparatus of the same type as that of the relay apparatus 10. That is, the other relay apparatus may be any communication apparatus as long as it can relay the communication frame. Similarly, there may be another relay apparatus on a transmission path between the relay apparatus 10 and the time synchronization device 40. Further, there may be another relay apparatus on a transmission path between the relay apparatus 10 and the monitoring apparatus 20.

Further, the relay apparatus 10 selects either the time synchronization device 30 or the time synchronization device 40, as a selection device. More specifically, the relay apparatus 10 selects as the selection device, a time synchronization device with a time synchronization parameter of better quality, based on information (a clock class defined in IEEE 802.1AS-2020 and the like) transmitted from the time synchronization device 30 and the time synchronization device 40, and indicating quality of the time synchronization parameter (specifically, the time). The relay apparatus 10 receives only the measured parameter value (specifically, the measured value of the time) from the selection device. Here, it is assumed that the relay apparatus 10 has selected the time synchronization device 30 as the selection device. The relay apparatus 10 receives the communication frame transmitted from the time synchronization device 30 and indicating the measured parameter value.

The relay apparatus 10 measures the propagation delay between the time synchronization device 30 and the relay apparatus 10, based on the measured value (the value of the timestamp) of the time notified by the time synchronization device 30 as the measured parameter value.

Further, the relay apparatus 10 measures the clock ratio of the time synchronization device 30 to the relay apparatus 10, based on the measured time (the value of the timestamp) of the time notified by the time synchronization device 30 as the measured parameter value.

Further, the relay apparatus 10 measures the retention time of the communication frame in the time synchronization device 30, based on the measured value (the value of the timestamp) of the time notified by the time synchronization device 30 as the measured parameter value.

As described above, each of the value of the timestamp (the time), the propagation delay, the clock ratio, and the retention time of the communication frame in the time synchronization device 30 is referred to as the time synchronization parameter. These time synchronization parameters are useful information for specifying an abnormality cause and an abnormality part in the time synchronization system 50.

When the relay apparatus 10 obtains the measured values of these time synchronization parameters, the relay apparatus 10 transmits to the time synchronization device 40, the communication frame indicating the measured values (the measured parameter values) of the time synchronization parameters, (via the other relay apparatus if there is the other relay apparatus).

Since the selection of the selection device, the measurement of the propagation delay, the measurement of the clock ratio, the measurement of the retention time, and the transmission of the communication frame to the time synchronization device 40, by the relay apparatus 10 are not directly related to operation of the relay apparatus 10 to be described in the present embodiment, a detailed description is omitted.

Further, the relay apparatus 10 calculates an abnormality degree for each time synchronization parameter. The abnormality degree is an index indicating possibility that an abnormality is included in the measured parameter value. Then, the relay apparatus 10 notifies the monitoring apparatus 20 of the abnormality degree for each calculated time synchronization parameter.

Details of the configuration and the operation of the relay apparatus 10 will be described below.

The relay apparatus 10 is equivalent to an information processing apparatus. Further, an operational procedure of the relay apparatus 10 is equivalent to an information processing method. Further, a program that implements the operation of the relay apparatus 10 is equivalent to an information processing program.

The monitoring apparatus 20 monitors communication between the time synchronization device 30 and the time synchronization device 40.

Figure 2:
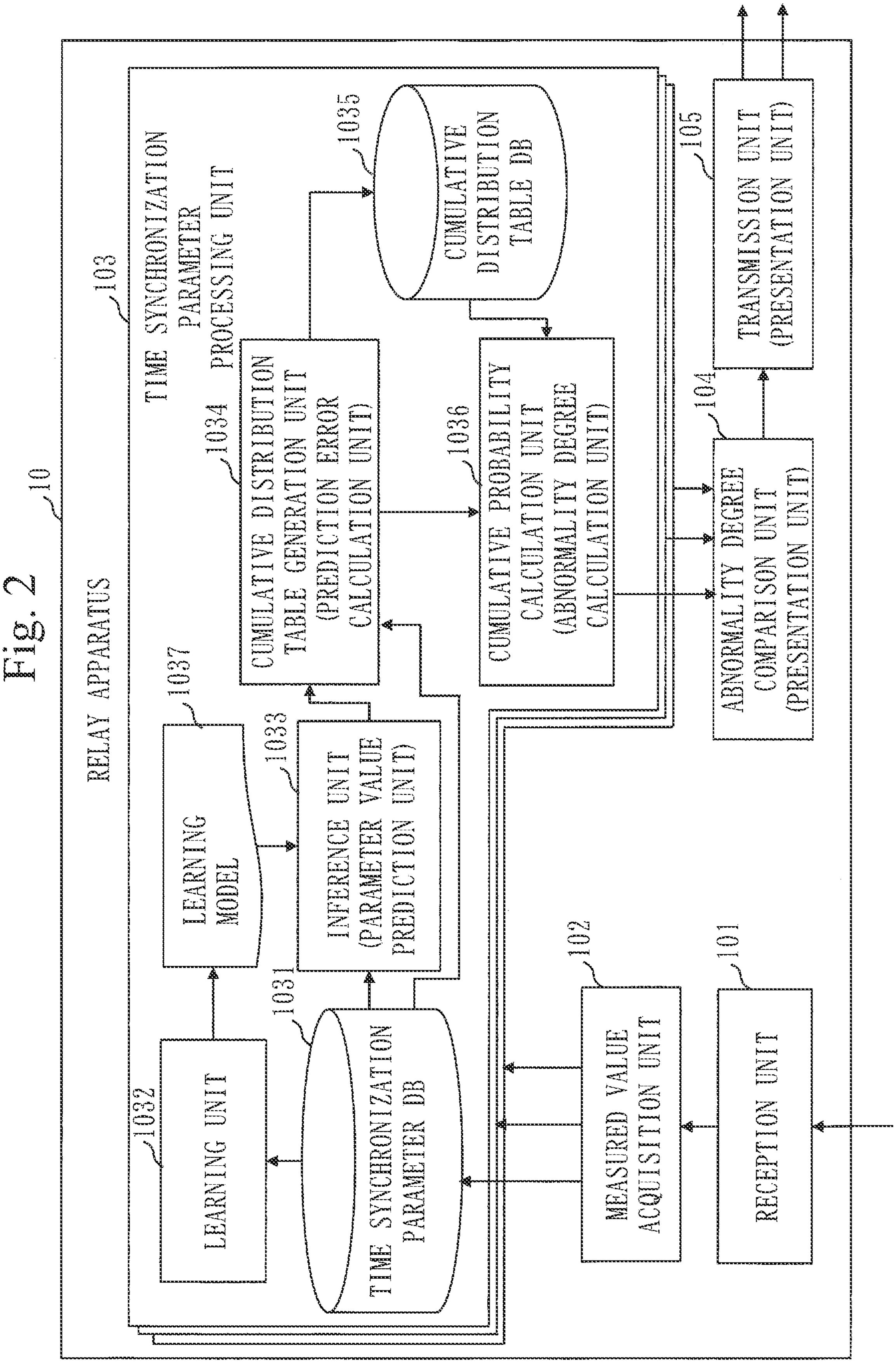
FIG. 2 is a diagram illustrating a functional configuration example of a relay apparatus according to Embodiment 1.

FIG. 2 illustrates a functional configuration example of the relay apparatus 10 according to the present embodiment.

Figure 3:
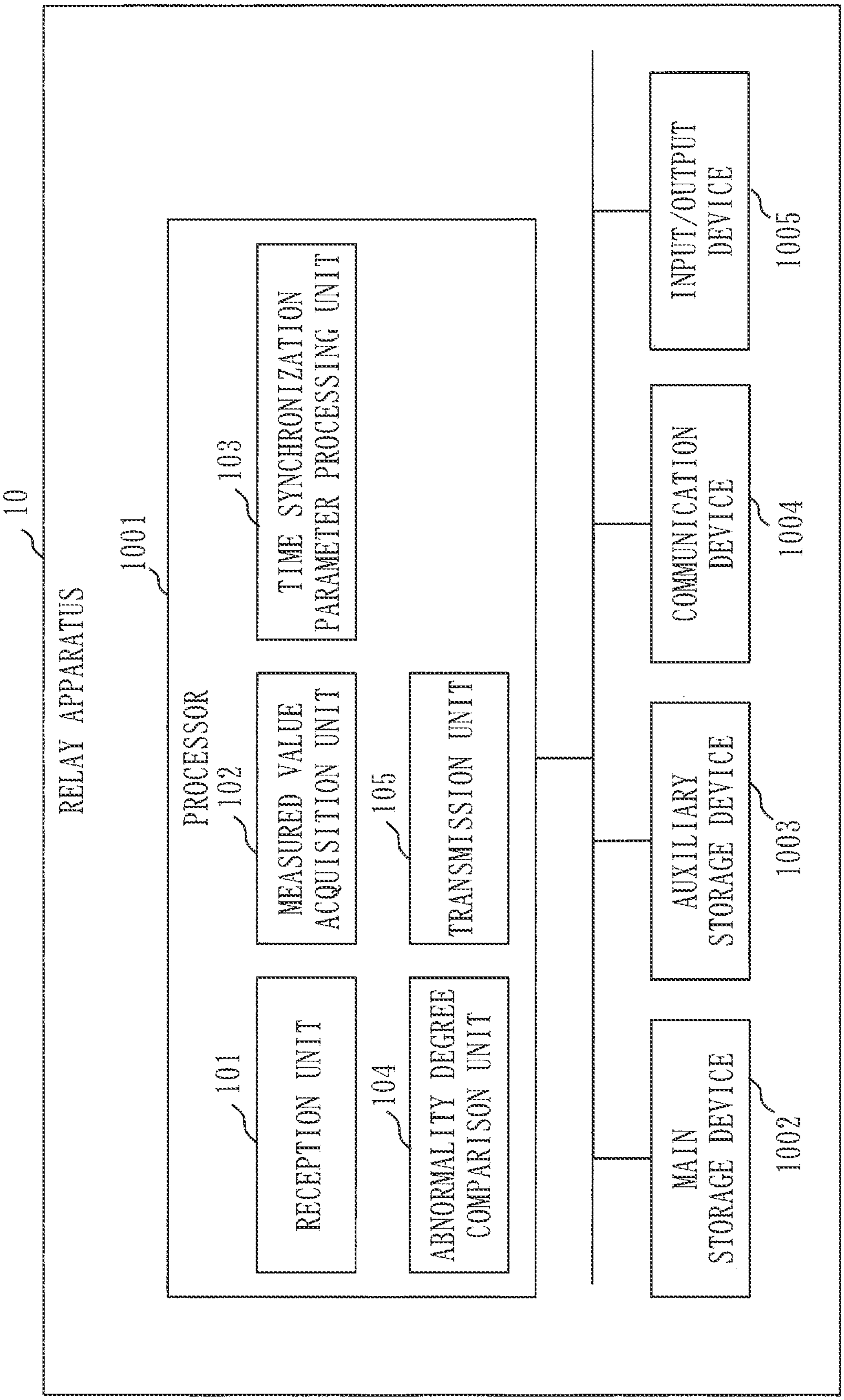
FIG. 3 is a diagram illustrating a hardware configuration example of the relay apparatus according to Embodiment 1.

Further, FIG. 3 illustrates a hardware configuration example of the relay apparatus 10 according to the present embodiment.

First, the hardware configuration example of the relay apparatus 10 will be described with reference to FIG. 3.

The relay apparatus 10 according to the present embodiment is a computer.

The relay apparatus 10 includes a processor 1001, a main storage device 1002, an auxiliary storage device 1003, a communication device 1004, and an input/output device 1005, as pieces of hardware.

Further, as illustrated in FIG. 2, the relay apparatus 10 includes a reception unit 101, a measured value acquisition unit 102, a time synchronization parameter processing unit 103, an abnormality degree comparison unit 104, and a transmission unit 105, as functional configurations. Functions of the reception unit 101, the measured value acquisition unit 102, the time synchronization parameter processing unit 103, the abnormality degree comparison unit 104, and the transmission unit 105 are implemented by, for example, programs.

The auxiliary storage device 1003 stores the programs that implement the functions of the reception unit 101, the measured value acquisition unit 102, the time synchronization parameter processing unit 103, the abnormality degree comparison unit 104, and the transmission unit 105.

These programs are loaded from the auxiliary storage device 1003 into the main storage device 1002. Then, the processor 1001 executes these programs and performs operation of the reception unit 101, the measured value acquisition unit 102, the time synchronization parameter processing unit 103, the abnormality degree comparison unit 104, and the transmission unit 105 to be described below.

FIG. 3 schematically illustrates a state in which the processor 1001 executes the programs that implement the functions of the reception unit 101, the measured value acquisition unit 102, the time synchronization parameter processing unit 103, the abnormality degree comparison unit 104, and the transmission unit 105.

The communication device 1004 is used for communication with the monitoring apparatus 20, the time synchronization device 30, and the time synchronization device 40.

The input/output device 1005 includes a mouse, a keyboard, a display, and the like.

Next, the functional configuration example of the relay apparatus 10 according to the present embodiment will be described with reference to FIG. 2.

As illustrated in FIG. 2, the relay apparatus 10 includes the reception unit 101, the measured value acquisition unit 102, the time synchronization parameter processing unit 103, the abnormality degree comparison unit 104, and the transmission unit 105.

The reception unit 101 receives the communication frame (hereinafter simply referred to as a frame) from the selection device (for example, the time synchronization device 30), using the communication device 1004. Then, the reception unit 101 outputs the received frame to the measured value acquisition unit 102.

The measured value acquisition unit 102 extracts from the frame, the measured value (the value of the timestamp) of the time. Further, the measured value acquisition unit 102 acquires the measured value of the propagation delay, the measured value of the clock ratio, and the measured value of the retention time obtained by measurement in a mechanism in the relay apparatus 10 which is not illustrated in FIG. 2. Then, the measured value acquisition unit 102 outputs these measured values as the measured parameter values, to the time synchronization parameter processing unit 103 corresponding to each measured value.

The time synchronization parameter processing unit 103 is provided for each time synchronization parameter. That is, the time synchronization parameter processing unit 103 is provided for, for example, each of the timestamp, the propagation delay, the clock ratio, and the retention time.

The time synchronization parameter processing unit 103 calculates the abnormality degree of the time synchronization parameter.

The abnormality degree is, as described above, an index indicating possibility that an abnormality is included in the measured parameter value which is the measured value of the time synchronization parameter.

The time synchronization parameter processing unit 103 includes a time synchronization parameter database 1031, a learning unit 1032, an inference unit 1033, a cumulative distribution table generation unit 1034, a cumulative distribution table database 1035, and a cumulative probability calculation unit 1036, as internal configurations.

Details of the internal configurations of the time synchronization parameter processing unit 103 will be described below.

The abnormality degree comparison unit 104 obtains the calculated abnormality degree from each time synchronization parameter processing unit 103.

Then, the abnormality degree comparison unit 104 arranges the time synchronization parameters in descending order of the abnormality degree.

Further, the abnormality degree comparison unit 104 notifies the transmission unit 105 of the abnormality degrees of the time synchronization parameters and the order of the time synchronization parameters.

The transmission unit 105 displays on a display of the input/output device 1005, the abnormality degrees of the time synchronization parameters and the names of the time synchronization parameters in the order notified by the abnormality degree comparison unit 104.

Further, the transmission unit 105 generates notification data indicating the abnormality degrees of the time synchronization parameters and the names of the time synchronization parameters in the order notified by the abnormality degree comparison unit 104. Then, the transmission unit 105 transmits the notification data to the monitoring apparatus 20, using the communication device 1004.

As described above, the abnormality degree comparison unit 104 and the transmission unit 105 present a plurality of types of time synchronization parameters in the descending order of the abnormality degree.

Therefore, the abnormality degree comparison unit 104 and the transmission unit 105 are equivalent to presentation units.

Next, the internal configurations of the time synchronization parameter processing unit 103 will be described.

The time synchronization parameter database 1031 stores the measured parameter values acquired by the measured value acquisition unit 102.

The learning unit 1032 performs in a learning phase, machine learning of the measured parameter values stored in the time synchronization parameter database 1031. Then, the learning unit 1032 generates a learning model 1037 by the machine learning. The learning model 1037 is a learning model for predicting from m ($m \geq 1$) past measured parameter values, n ($n \geq 1$) future prediction parameter values.

The prediction parameter value is a future parameter value of the time synchronization parameter. That is, the prediction parameter value is the prediction value of the parameter value of the time synchronization parameter.

The measured parameter value is generated at a generation timing that repeatedly arrives.

That is, the learning unit 1032 generates the learning model 1037 for predicting the n prediction parameter values that would be generated at n future generation timings (n times), based on the m measured parameter values generated at m past generation timings (m times).

The learning unit 1032 generates, for example, a regression model as the learning model 1037.

The inference unit 1033 predicts in an inference phase, the n future prediction parameter values from the m past measured parameter values, using the learning model 1037.

That is, the inference unit 1033 predicts the n prediction parameter values of the n future generation timings (the n times), based on the m measured parameter values of the m past generation timings (the m times).

The inference unit 1033 is equivalent to a parameter value prediction unit. Further, a process performed by the inference unit 1033 is equivalent to a parameter prediction process.

The cumulative distribution table generation unit 1034 calculates a prediction error in the inference phase.

More specifically, when the measured parameter value which is the measured value corresponding to the prediction parameter value is generated with elapse of time, the cumulative distribution table generation unit 1034 calculates in the inference phase, a difference between the measured parameter value and the prediction parameter value, as the prediction error.

For example, it is assumed that the prediction parameter value of a time i (i≥1) is generated by the inference unit 1033. The time i is a future time at a time point when the prediction parameter value of the time i has been generated. When the time i has arrived with elapse of time, the measured value of the time synchronization parameter is generated as the measured parameter value of the time i. The measured parameter value of the time i is eventually stored into the time synchronization parameter database 1031, via the reception unit 101 and the measured value acquisition unit 102.

The cumulative distribution table generation unit 1034 obtains from the time synchronization parameter database 1031, the measured parameter value of the time i corresponding to the prediction parameter value of the time i. In such a manner, the cumulative distribution table generation unit 1034 obtains n measured parameter values corresponding to the n prediction parameter values. Then, the cumulative distribution table generation unit 1034 calculates the prediction error, using the n measured parameter values and the n prediction parameter values. A calculation method of the prediction error will be described below.

Further, the cumulative distribution table generation unit 1034 generates and updates a cumulative distribution table, using a plurality of prediction errors. The cumulative distribution table is a table indicating a cumulative frequency for each prediction error. The cumulative frequency is the cumulative number of times of occurrence of prediction errors.

The cumulative distribution table generation unit 1034 stores the generated or updated cumulative distribution table into the cumulative distribution table database 1035.

When the cumulative distribution table generation unit 1034 generates or updates the cumulative distribution table, the cumulative distribution table generation unit 1034 notifies the cumulative probability calculation unit 1036 of the generation or the update of the cumulative distribution table.

The cumulative distribution table generation unit 1034 is equivalent to a prediction error calculation unit. Further, a process performed by the cumulative distribution table generation unit 1034 is equivalent to a prediction error calculation process.

The cumulative distribution table database 1035 holds the cumulative distribution table.

The cumulative probability calculation unit 1036 calculates the abnormality degree.

More specifically, when there is notification from the cumulative distribution table generation unit 1034, the cumulative probability calculation unit 1036 obtains the cumulative distribution table from the cumulative distribution table database 1035. Then, the cumulative probability calculation unit 1036 calculates the abnormality degree, using the cumulative frequency indicated in the cumulative distribution table for each value of the prediction error. A calculation procedure of the abnormality degree will be described below.

The cumulative probability calculation unit 1036 outputs the calculated abnormality degree to the abnormality degree comparison unit 104.

The cumulative probability calculation unit 1036 is equivalent to an abnormality degree calculation unit. Further, a process performed by the cumulative probability calculation unit 1036 is equivalent to an abnormality degree calculation process.

Description of Operation

An operational example of the relay apparatus 10 according to the present embodiment will be described below.

In the following, the operational example of the relay apparatus 10 will be described with the operational example separated into an operational example in the learning phase and an operational example in the inference phase.

<Learning Phase>

Figure 4:
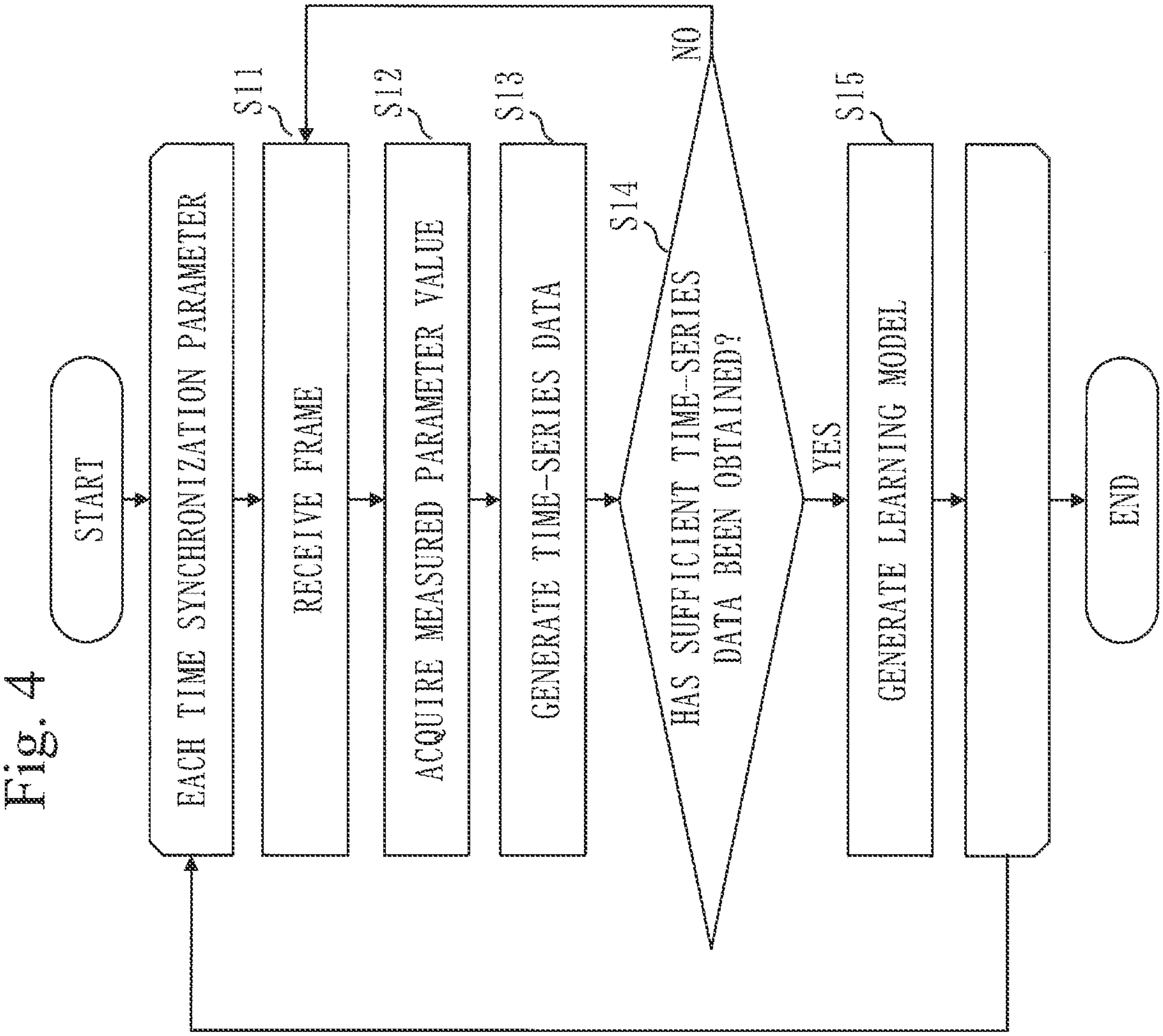
FIG. 4 is a flowchart illustrating an operational example of the relay apparatus in a learning phase according to Embodiment 1.

FIG. 4 illustrates the operational example of the relay apparatus 10 in the learning phase.

In the learning phase, first, the reception unit 101 receives the frame in step S11.

The reception unit 101 outputs the received frame to the measured value acquisition unit 102.

Next, in step S12, the measured value acquisition unit 102 acquires the measured parameter value of the time synchronization parameter. Specifically, the measured value acquisition unit 102 extracts from the frame, the measured value (the value of the timestamp) of the time. Further, the measured value acquisition unit 102 acquires the measured value of the propagation delay, the measured value of the clock ratio, and the measured value of the retention time obtained by measurement in the mechanism in the relay apparatus 10 which is not illustrated in FIG. 2. Then, the measured value acquisition unit 102 stores the acquired measured values as the measured parameter values, into the time synchronization parameter database 1031 corresponding to each measured value.

Next, in step S13, the learning unit 1032 acquires from the time synchronization parameter database 1031, the measured parameter values for a certain period, and generates time-series data of the measured parameter values.

Next, in step S14, the learning unit 1032 determines whether or not the time-series data sufficient for learning has been generated.

When the time-series data sufficient for the learning has not been generated (NO in step S14), the process returns to step S11.

That is, the learning unit 1032 performs the generation of the time-series data, using the measured parameter values of newly received frames.

On the other hand, when the time-series data sufficient for the learning has been generated (YES in step S14), the learning unit 1032 generates in step S15, the learning model 1037 that predicts the n future prediction parameter values from the m past measured parameter values. The learning unit 1032 generates, for example, a regression model as the learning model 1037.

As described above, there are the value (the time) of the timestamp, the propagation delay time, the clock ratio, and the frame retention time, as the types of the time synchronization parameters.

The operation of FIG. 4 is performed in the corresponding time synchronization parameter processing unit 103 for each time synchronization parameter, and the learning model 1037 is generated for each time synchronization parameter.

Further, since the time synchronization parameters are used as learning data for the generation of the learning model 1037, it is necessary to obtain the time synchronization parameter in a state in which the time synchronization system 50 normally operates.

In step S13, the learning unit 1032 generates the time-series data of differences between a followed measured parameter value and a following measured parameter value in chronological order, that is, the time-series data of variation values of the measured parameter values. For example, it is conceivable that the learning unit 1032 calculates the variation values, using the followed measured parameter value and the following measured parameter value as they are in the chronological order. Alternatively, the learning unit 1032 may calculate the variation values, using the measured parameter values after sampling or the measured parameter values after smoothing.

In step S15, using the measured parameter values of the time synchronization parameter of one type, the learning unit 1032 performs the learning (single regression or auto regression) to predict the parameter values of the time synchronization parameter of the same type, for example. In this case, the learning unit 1032 generates the learning model 1037 (the regression model) which can generate from the m measured parameter values of one type, the n prediction parameter values of the same type. Further, the learning unit 1032 may perform the learning (multiple regression) to predict the parameter values of the time synchronization parameter of one type among time synchronization parameters of the plurality of types, using the measured parameter values of time synchronization parameters of the plurality of types. In this case, the learning unit 1032 generates the learning model 1037 (the regression model) which can generate from the m measured parameter values of time synchronization parameters of the plurality of types, the n prediction parameter values of time synchronization parameter of one type among time synchronization parameters of the plurality of types.

Further, "m" which is the number of measured parameter values, and "n" which is the number of prediction parameter values may be the same or different.

The learning unit 1032 generates as the learning model 1037, for example, the regression model such as a Time Delay Neural Network (TDNN), a Recurrent Neural Network (RNN), a Long Short-Term Memory (LSTM), or a Gated Recurrent Unit (GRU).

<Inference Phase>

Figure 5:
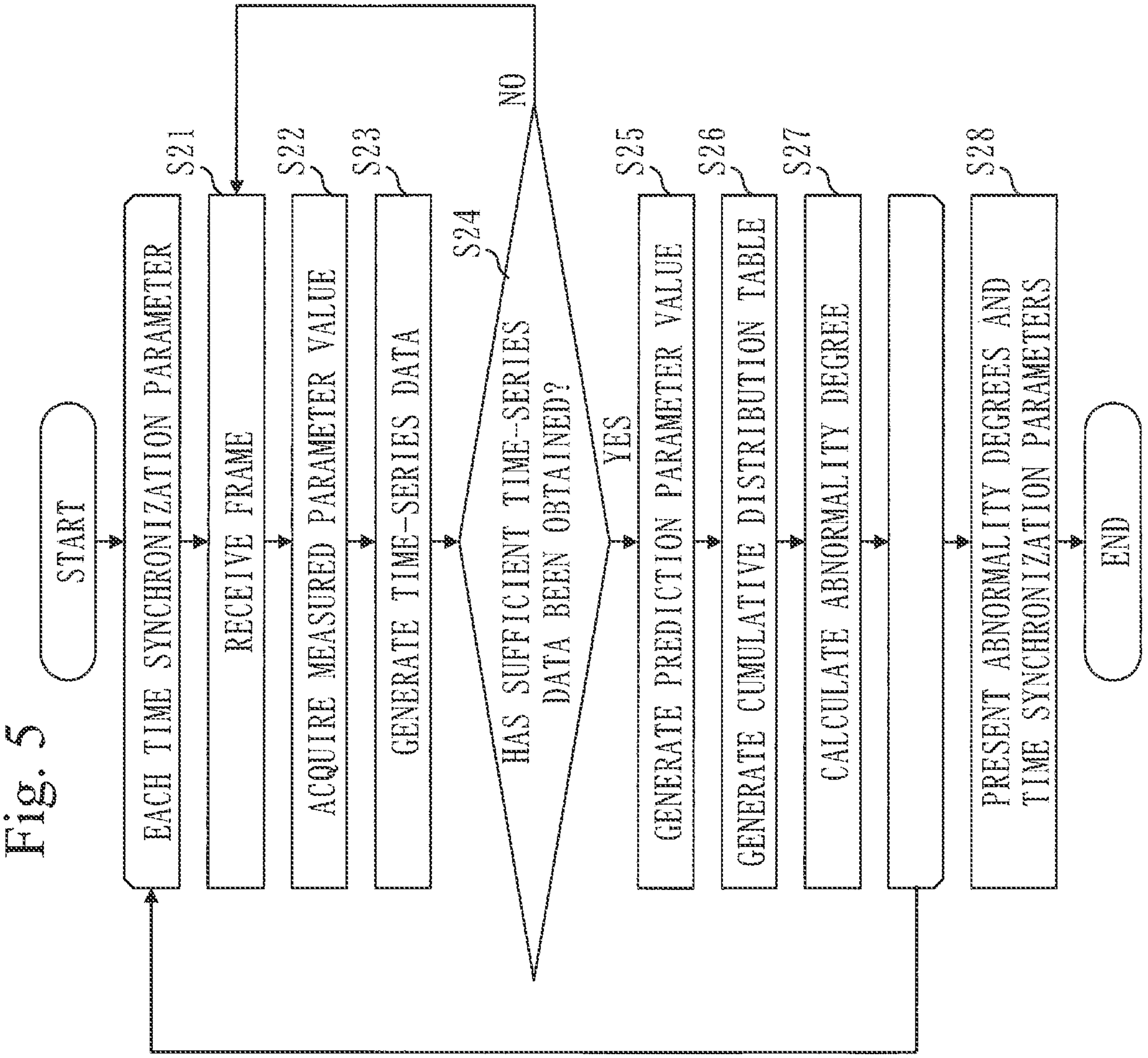
FIG. 5 is a flowchart illustrating an operational example of the relay apparatus in an inference phase according to Embodiment 1.

FIG. 5 illustrates the operational example of the relay apparatus 10 in the inference phase.

In the inference phase, the reception unit 101 receives the frame in step S21.

The reception unit 101 outputs the received frame to the measured value acquisition unit 102.

Next, in step S22, the measured value acquisition unit 102 acquires the measured parameter value of the time synchronization parameter. Specifically, the measured value acquisition unit 102 extracts from the frame, the measured value (the value of the timestamp). Further, the measured value acquisition unit 102 acquires the measured value of the propagation delay, the measured value of the clock ratio, and the measured value of the retention time obtained by measurement in the mechanism in the relay apparatus 10 which is not illustrated in FIG. 2. Then, the measured value acquisition unit 102 stores the acquired measured values as the measured parameter values, into the time synchronization parameter database 1031 corresponding to each measured value.

Next, in step S23, the inference unit 1033 acquires from the time synchronization parameter database 1031, the measured parameter values for a certain period, and generates time-series data of the measured parameter values.

Next, in step S24, the inference unit 1033 determines whether or not the time-series data sufficient for prediction has been generated.

When the time-series data sufficient for the prediction has not been generated (NO in step S24), the process returns to step S21.

That is, the inference unit 1033 performs the generation of the time-series data, using the measured parameter values of newly received frames.

On the other hand, when the time-series data sufficient for the prediction has been generated (YES in step S24), the inference unit 1033 generates the n future prediction parameter values from the m past measured parameter values, using the learning model 1037.

"m" which is the number of measured parameter values and "n" which is the number of prediction parameter values are the same as the values set at the generation of the learning model 1037.

The inference unit 1033 outputs the n generated prediction parameter values to the cumulative distribution table generation unit 1034.

The cumulative distribution table generation unit 1034 holds the n prediction parameter values until the n measured parameter values corresponding to the n prediction parameter values are stored into the time synchronization parameter database 1031.

Next, in step S26, the cumulative distribution table generation unit 1034 generates the cumulative distribution table.

Specifically, the cumulative distribution table generation unit 1034 generates the cumulative distribution table according to the following procedure.

First, the cumulative distribution table generation unit 1034 acquires from the time synchronization parameter database 1031, the n measured parameter values corresponding to the n prediction parameter values output by the inference unit 1033.

As described above, when the time i has arrived with elapse of time, the measured parameter value of the time i corresponding to the prediction parameter value of the time i is generated, and the measured parameter value of the time i is stored into the time synchronization parameter database 1031. As a result, after elapse of time, the n measured parameter values corresponding to the n prediction parameter values are stored into the time synchronization parameter database 1031.

The cumulative distribution table generation unit 1034 calculates as the prediction error, a mean absolute error (MAE) between the n prediction parameter values and the n measured parameter values according to the following Formula 1.

In Formula 1, yi indicates the prediction parameter value of the time i. Further, xi indicates the measured parameter value of the time i.

Formula 1

$$MAE = \frac{\sum_{i=1}^{n} |y_i - x_i|}{n} \quad \text{Formula 1}$$

When the calculation of the prediction error has completed, the cumulative distribution table generation unit 1034 updates the cumulative distribution table.

The cumulative distribution table is a table having two columns which are "prediction error" and "cumulative frequency".

The number of times (the frequency) of obtaining the prediction errors being less than or equal to the "prediction error" in the same row is recorded in the "cumulative frequency" of the cumulative distribution table. For example, if the number of times of obtaining the prediction errors being less than or equal to "1" is 2, there is a row in which the "prediction error" is"1" and the "cumulative frequency" is "2" in the cumulative distribution table.

The cumulative distribution table generation unit 1034 stores the cumulative distribution table into the cumulative distribution table database 1035.

Further, the cumulative distribution table generation unit 1034 notifies the cumulative probability calculation unit 1036 that the cumulative distribution table has been updated.

Details of an update procedure of the cumulative distribution table by the cumulative distribution table generation unit 1034 will be described below.

Next, in step S27, the cumulative probability calculation unit 1036 calculates the abnormality degree of the time synchronization parameter.

Specifically, the cumulative probability calculation unit 1036 obtains the cumulative distribution table from the cumulative distribution table database 1035. Then, the cumulative probability calculation unit 1036 calculates the abnormality degree by applying to the following Formula 2, the cumulative frequency of the prediction error indicated in the obtained cumulative distribution table.

Further, the cumulative probability calculation unit 1036 outputs the calculated abnormality degree to the abnormality degree comparison unit 104.

Formula 2

$$\text{abnormality degree} = \frac{\text{cumulative frequency of prediction error}}{\text{cumulative frequency of maximum prediction error}} \quad \text{Formula 2}$$

The abnormality degree calculated by Formula 2 is synonymous with cumulative probability of the prediction error. That is, the abnormality degree can be regarded as the abnormality degree to which prediction accuracy for each time synchronization parameter is considered. Accordingly, it is possible to compare the abnormality degrees of the time synchronization parameters with each other in the abnormality degree comparison unit 104.

The above steps S21 to S27 are performed for each time synchronization parameter. Further, the abnormality degree is updated with a new abnormality degree every time when the prediction error is calculated. Therefore, the abnormality degree is calculated for each time synchronization parameter.

When the abnormality degrees of all time synchronization parameters are calculated, the time synchronization parameters are presented in the descending order of the abnormality degree in step S28.

Specifically, the abnormality degree comparison unit 104 arranges the time synchronization parameters in the descending order of the abnormality degree. Further, the abnormality degree comparison unit 104 notifies the transmission unit 105 of the abnormality degrees of the time synchronization parameters and the order of the time synchronization parameters.

Then, the transmission unit 105 displays on the display of the input/output device 1005, the abnormality degrees of the time synchronization parameters and the names of the time synchronization parameters in the order notified by the abnormality degree comparison unit 104.

Further, the transmission unit 105 generates the notification data indicating the abnormality degrees of the time synchronization parameters and the names of the time synchronization parameters in the order notified by the abnormality degree comparison unit 104. Then, the transmission unit 105 transmits the notification data to the monitoring apparatus 20, using the communication device 1004.

The transmission unit 105 may graphically display the order of the time synchronization parameters on the display of the input/output device 1005, using a bar graph or the like.

Further, the transmission unit 105 may emphatically display a time synchronization parameter whose abnormality degree is equal to or greater than a threshold value.

The comparison of the abnormality degrees by the abnormality degree comparison unit 104, the displaying on the display by the transmission unit 105, and the transmission of the notification data to the notification to the monitoring apparatus 20 by the transmission unit 105 are performed at a timing when the abnormality degree of a time synchronization parameter among the plurality of time synchronization parameters is updated.

Nest, the update procedure of the cumulative distribution table by the cumulative distribution table generation unit 1034 will be described with reference to FIGS. 9, 10, and 11.

Figure 9:
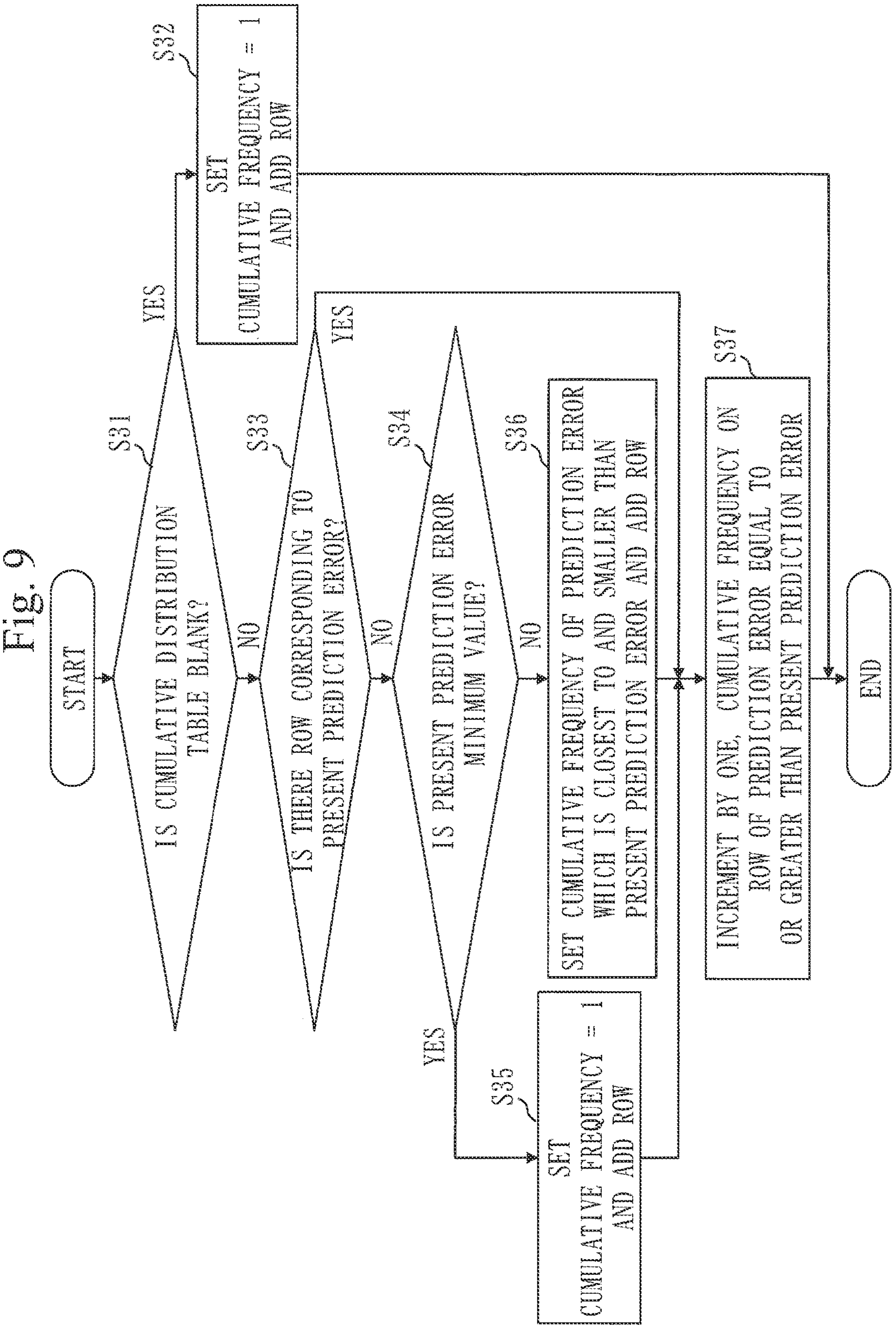
FIG. 9 is a flowchart illustrating an update procedure of a cumulative distribution table according to Embodiment 1.

FIG. 9 is a flowchart illustrating the update procedure of the cumulative distribution table by the cumulative distribution table generation unit 1034.

FIGS. 10 and 11 illustrate specific examples of the update of the cumulative distribution table.

In FIG. 9, the cumulative distribution table generation unit 1034 determines in step S31, whether or not the cumulative distribution table is blank.

When the cumulative distribution table is blank (YES in step S31), the cumulative distribution table generation unit 1034 sets the cumulative frequency=1 and adds to the cumulative distribution table, a row corresponding to the presently calculated prediction error, in step S32.

When the cumulative distribution table is not blank (NO in step S31), the cumulative distribution table generation unit 1034 determines in step S33, whether or not there is the row corresponding to the presently calculated prediction error in the cumulative distribution table.

When there is the row corresponding to the presently calculated prediction error in the cumulative distribution table (YES in step S33), the process proceeds to step S37.

On the other hand, when there is no row corresponding to the presently calculated prediction error in the cumulative distribution table (NO in step S33), the cumulative distribution table generation unit 1034 determines in step S34, whether or not the presently calculated prediction error is a minimum value. That is, the cumulative distribution table generation unit 1034 determines whether or not the presently calculated prediction error is smaller than the current minimum value among the prediction errors which exist in the cumulative distribution table.

When the presently calculated prediction error is not the minimum value (NO in step S34), the process proceeds to step S36.

On the other hand, when the presently calculated prediction error is the minimum value (YES in step S34), the cumulative distribution table generation unit 1034 sets the cumulative frequency=1 and adds to the cumulative distribution table, the row corresponding to the presently calculated prediction error, in step S35.

After that, the process proceeds to step S37.

In step S36, the cumulative frequency of the prediction error which is closest to and smaller than the presently calculated prediction error is set, and the row corresponding to the presently calculated prediction error is added to the cumulative distribution table.

After that, the process proceeds to step S37.

In step S37, the cumulative distribution table generation unit 1034 increments by one, the cumulative frequency on a row of the prediction error being equal to or greater than the presently calculated prediction error.

Next, using FIGS. 10 and 11, the specific examples of the update of the cumulative distribution table will be described.

(a) of FIG. 10 illustrates a state of the cumulative distribution table before the update.

Here, it is assumed that the “prediction error: 7” is calculated.

Since the cumulative distribution table is not blank in the flow of FIG. 9 (NO in step S31), the cumulative distribution table generation unit 1034 determines whether or not there is a row corresponding to the presently calculated “prediction error: 7” in the cumulative distribution table (step S33).

There is no row corresponding to the “prediction error: 7” in the cumulative distribution table of (a) of FIG. 10 (NO in step S33). Therefore, the cumulative distribution table generation unit 1034 determines whether or not the presently calculated “prediction error: 7” is the minimum value (step S34).

There are the prediction errors which are smaller than the “prediction error: 7” in the cumulative distribution table of (a) of FIG. 10 (NO in step S34). Therefore, the cumulative distribution table generation unit 1034 sets “3” which is the cumulative frequency of the “prediction error: 2” which is a prediction error closest to and smaller than the “prediction error: 7”, and adds the row of the “prediction error: 7” to the cumulative distribution table (step S36).

Further, the cumulative distribution table generation unit 1034 increments by one, the cumulative frequency on a row of the prediction error equal to or greater than the “prediction error: 7” (step S37). Specifically, the cumulative distribution table generation unit 1034 increments by one, the cumulative frequency of each of the “prediction error: 7”, the “prediction error: 8”, and the “prediction error: 10”.

By the above procedure, the cumulative distribution table of (a) of FIG. 10 is updated to the state illustrated in (b) of FIG. 10.

Next, it is assumed that the “prediction error: 8” is calculated when the cumulative distribution table of (b) of FIG. 10 is obtained.

Since the cumulative distribution table is not blank in the flow of FIG. 9 (NO in step S31), the cumulative distribution table generation unit 1034 determines whether or not there is a row corresponding to the presently calculated “prediction error: 8” in the cumulative distribution table (step S33).

There is the row corresponding to the presently calculated “prediction error: 8” in the cumulative distribution table of (b) of FIG. 10 (YES in step S33). Therefore, the cumulative distribution table generation unit 1034 increments by one, the cumulative frequency on a row of the prediction error equal to or greater than the presently calculated “prediction error: 8” (step S37). Specifically, the cumulative distribution table generation unit 1034 increments by one, the cumulative frequency of each of the “prediction error: 8” and the “prediction error: 10”.

By the above procedure, the cumulative distribution table of (b) of FIG. 10 is updated to the state illustrated in (c) of FIG. 11.

Next, details of the calculation of the abnormality degree will be described, using FIGS. 10 and 11.

When the cumulative distribution table is updated as illustrated in (b) of FIG. 10, the cumulative probability calculation unit 1036 calculates in step S27 of FIG. 5, the abnormality degree by Formula 2, using the cumulative frequency of the presently calculated “prediction error: 7”. That is, the cumulative probability calculation unit 1036 divides the cumulative frequency 4 of the “prediction error: 7” by the “cumulative frequency: 7” of the “maximum prediction error: 10”, and obtains “0.571” as the abnormality degree.

Further, when the cumulative distribution table is updated as illustrated in (c) of FIG. 11, the cumulative probability calculation unit 1036 calculates in step S27 of FIG. 5, the abnormality degree by Formula 2, using the cumulative frequency of the presently calculated “prediction error: 8”. That is, the cumulative probability calculation unit 1036 divides the “cumulative frequency: 7” of the “prediction error: 8” by the “cumulative frequency: 8” of the “maximum prediction error: 10”, and obtains “0.875” as the abnormality degree.

In this manner, the cumulative distribution table is generated for each time synchronization parameter, and the abnormality degree is calculated for each time synchronization parameter.

Further, a supplementary description regarding the calculation of the abnormality degree will be given.

Figure 12:
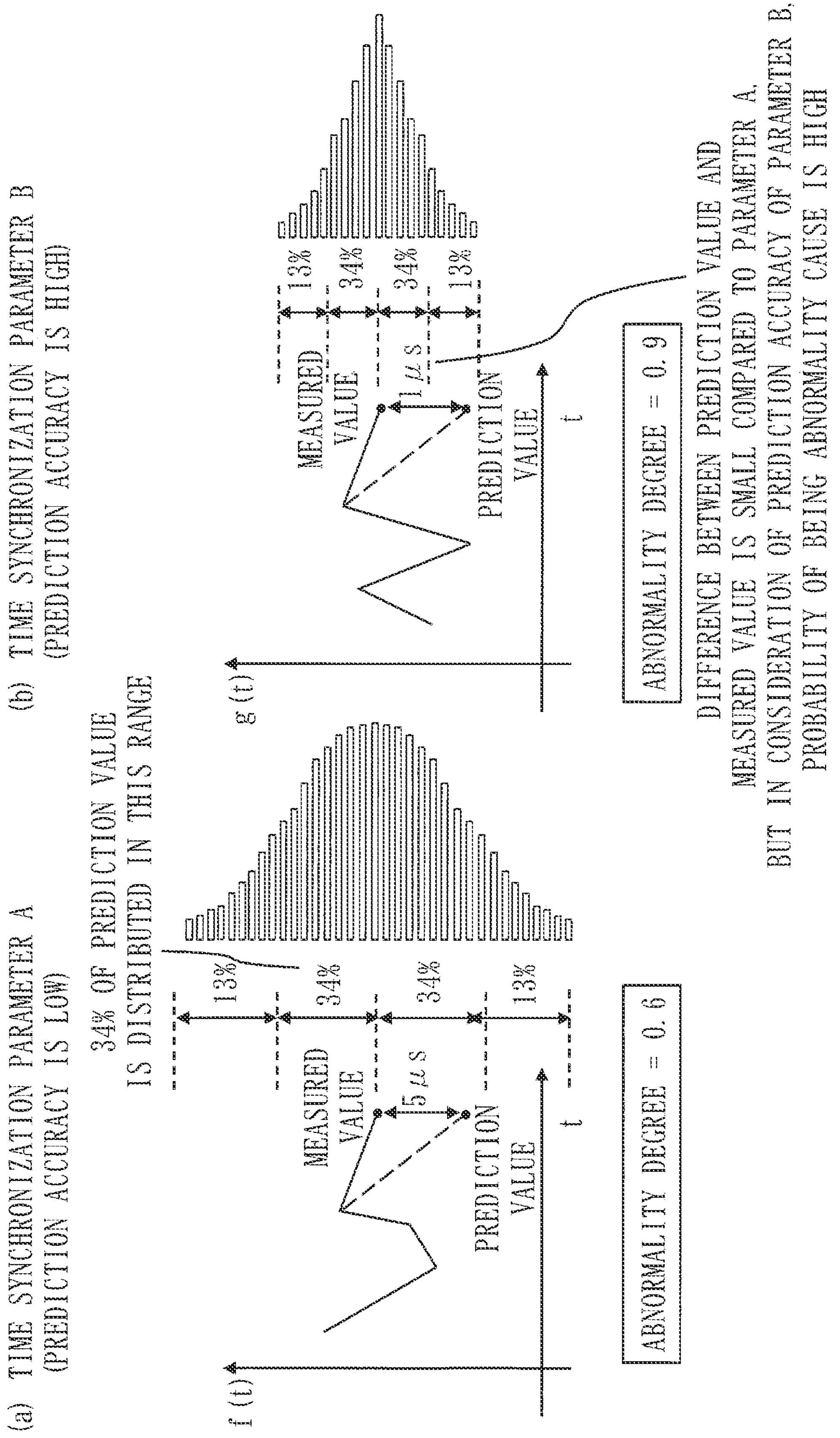
FIG. 12 is a diagram illustrating calculation of an abnormality degree in consideration of prediction accuracy according to Embodiment 1.

FIG. 12 illustrates the calculation of the abnormality degree in consideration of the prediction error.

In step S15 of FIG. 4, the learning unit 1032 generates the learning model without considering the prediction error for each time synchronization parameter. However, if the prediction error differs from one time synchronization parameter to another, it is conceivable that even the same prediction error gives different influences on the abnormality degrees of the time synchronization parameters.

For example, a time synchronization parameter A and a time synchronization parameter B are assumed, where 70% of prediction parameter values is supposed to fall within a range of an error of 10 us as for the time synchronization parameter A and 70% of prediction parameter values is supposed to fall within a range of an error of lus as for the time synchronization parameter B.

In this case, it is assumed that 2 us has been obtained as the prediction error for both of the time synchronization parameter A and the time synchronization parameter B. The prediction error gives different influences on the abnormality degree of the time synchronization parameter A and the abnormality degree of the time synchronization parameter B in this example. Since 70% of the prediction parameter values falls within the range of the error of 1 μs as for the time synchronization parameter B, the prediction error such that "a difference between the prediction parameter value and the measured parameter value is 2 μs" is a prediction error that exceeds the normal range for the time synchronization parameter B. It is preferable that the cumulative probability calculation unit 1036 calculates the abnormality degree in consideration of such an influence degree of a prediction error.

Description of Effects of Embodiment

As described above, in the present embodiment, an abnormality cause is estimated based on a comparison result of a prediction value and a measured value of a time synchronization parameter, at a plurality of times. Therefore, according to the present embodiment, even if the time synchronization parameter which is a candidate for the abnormality cause complicatedly fluctuates, the abnormality cause can be estimated without requiring empirical knowledge relating to time synchronization calculation.

That is, according to the present embodiment, it is possible to facilitate detection of an abnormality included in a parameter value of the time synchronization parameter.

Embodiment 2

In the present embodiment, differences from Embodiment 1 will be mainly described.

Matters not described below are the same as those in Embodiment 1.

In Embodiment 1, the relay apparatus 10 calculates the abnormality degree of the time synchronization parameter. In the present embodiment, an example will be described in which the monitoring apparatus 20 calculates the abnormality degree of the time synchronization parameter in place of the relay apparatus 10.

Description of Configuration

Figure 6:
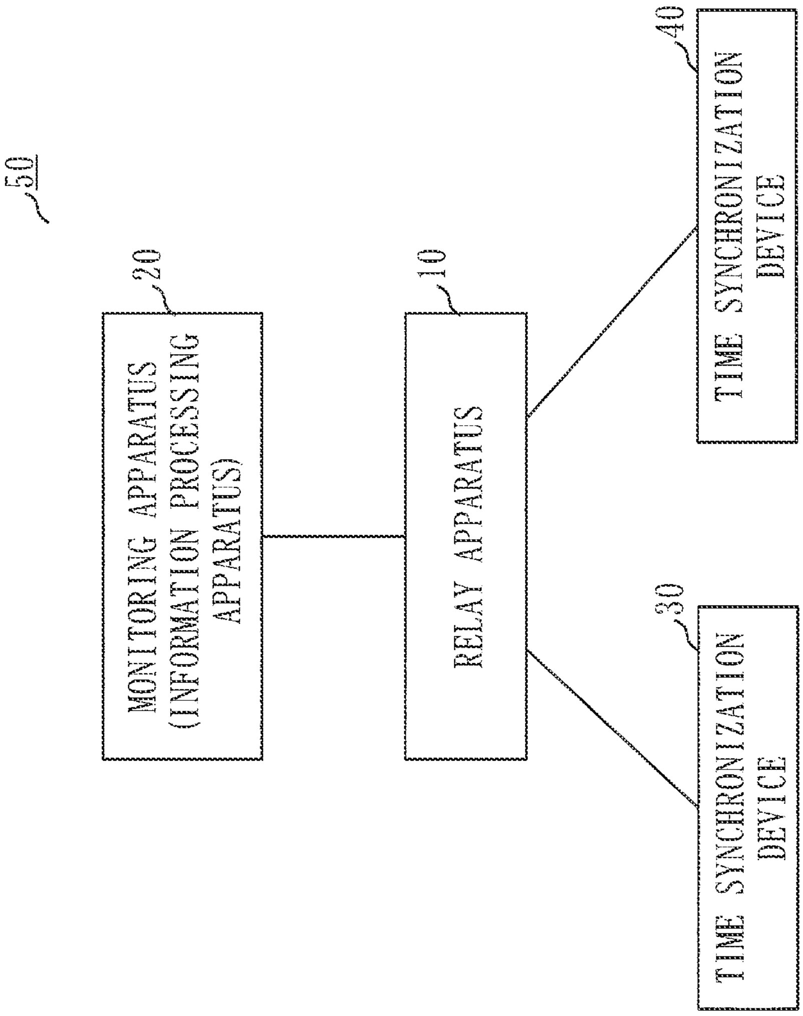
FIG. 6 is a diagram illustrating a configuration example of the time synchronization system according to Embodiment 2.

FIG. 6 illustrates a configuration example of the time synchronization system 50 according to the present embodiment.

The relay apparatus 10, the monitoring apparatus 20, the time synchronization device 30, and the time synchronization device 40 are the same as those illustrated in FIG. 1. However, in the present embodiment, the monitoring apparatus 20 is equivalent to an information processing apparatus. Further, an operational procedure of the monitoring apparatus 20 is equivalent to an information processing method. Further, a program that implements operation of the monitoring apparatus 20 is equivalent to an information processing program.

In the present embodiment, the relay apparatus 10 receives the communication frame from the time synchronization device 30 and the time synchronization device 40, and transmits the received communication frame (hereinafter simply referred to as a frame) to the monitoring apparatus 20.

In the present embodiment, the monitoring apparatus 20 receives the communication frame transmitted from the relay apparatus 10, performs the same operation as that of the relay apparatus 10 of Embodiment 1, and calculates the abnormality degree of the time synchronization parameter.

In the present embodiment, since the relay apparatus 10 only relays the communication frame from the selection device, components of the relay apparatus 10 may only be the reception unit 101 and the transmission unit 105 illustrated in FIG. 2.

Figure 7:
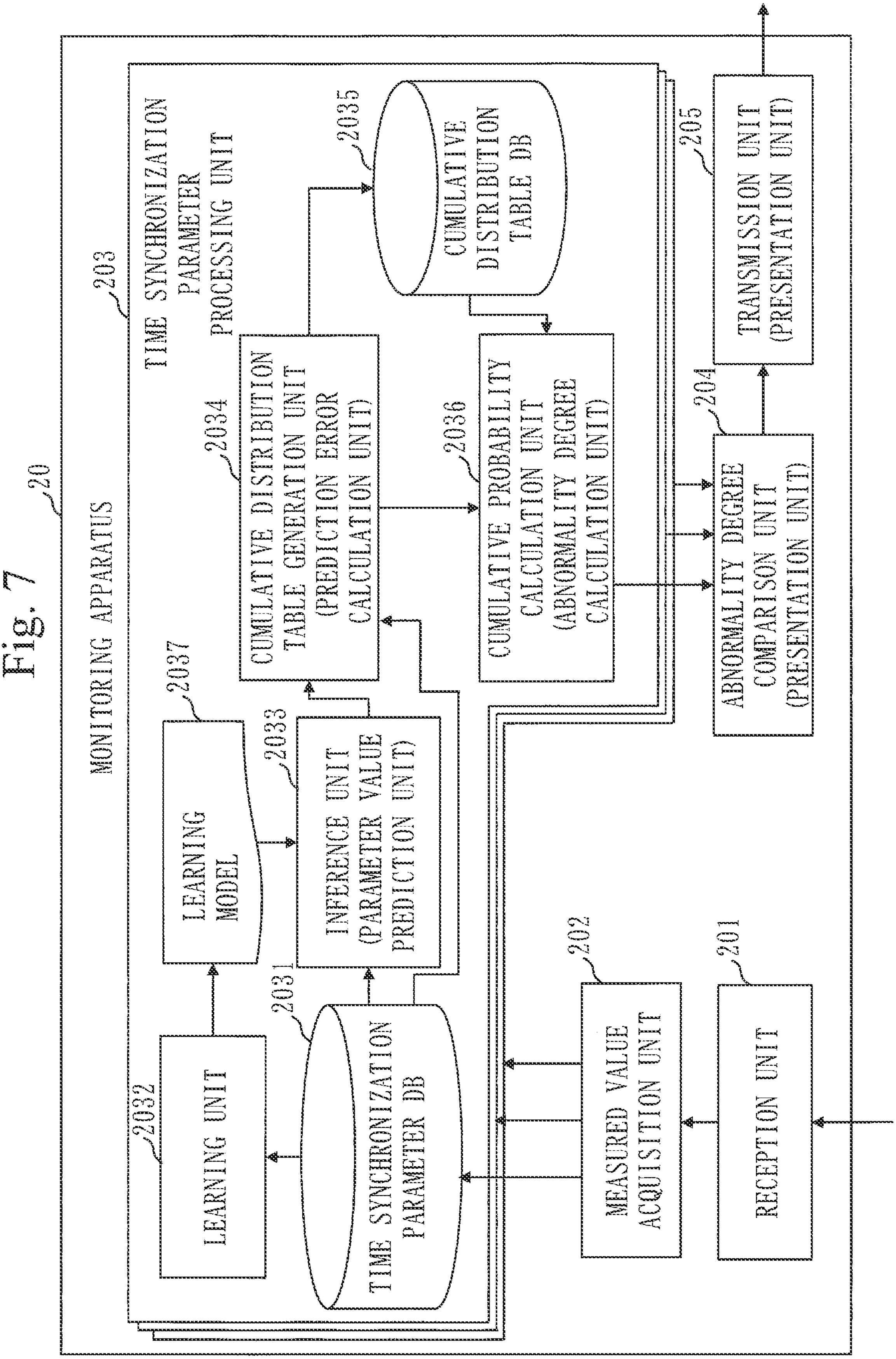
FIG. 7 is a diagram illustrating a functional configuration example of a monitoring apparatus according to Embodiment 2.

FIG. 7 illustrates a functional configuration example of the monitoring apparatus 20 according to the present embodiment.

Figure 8:
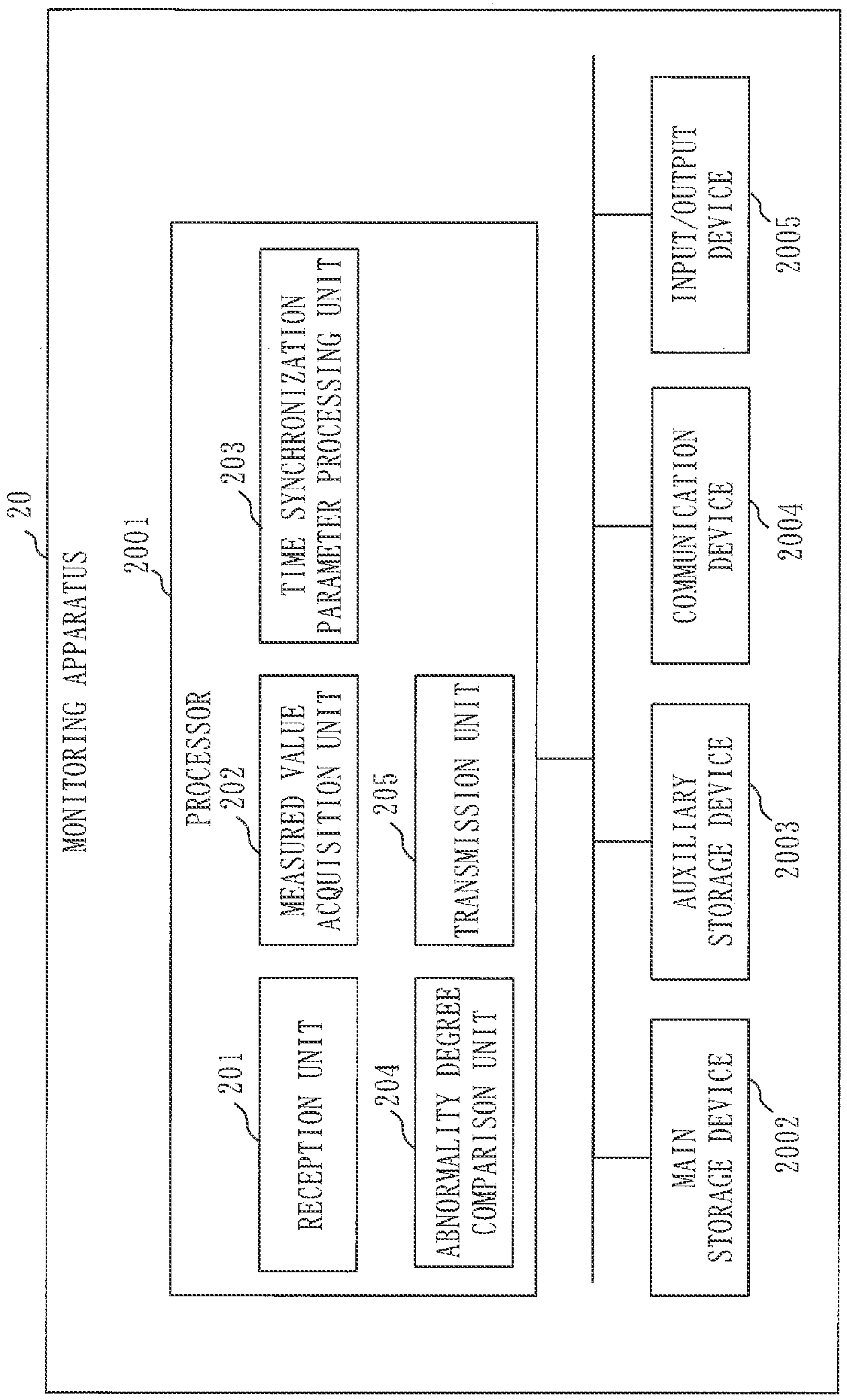
FIG. 8 is a diagram illustrating a hardware configuration example of the monitoring apparatus according to Embodiment 2.

Further, FIG. 8 illustrates a hardware configuration example of the monitoring apparatus 20 according to the present embodiment.

The monitoring apparatus 20 according to the present embodiment is a computer.

As illustrated in FIG. 8, the monitoring apparatus 20 includes a processor 2001, a main storage device 2002, an auxiliary storage device 2003, a communication device 2004, and an input/output device 2005, as pieces of hardware.

Further, as illustrated in FIG. 7, the monitoring apparatus 20 includes a reception unit 201, a measured value acquisition unit 202, a time synchronization parameter processing unit 203, an abnormality degree comparison unit 204, and a transmission unit 205, as functional configurations. Functions of the reception unit 201, the measured value acquisition unit 202, the time synchronization parameter processing unit 203, the abnormality degree comparison unit 204, and the transmission unit 205 are implemented by, for example, programs.

The auxiliary storage device 2003 stores the programs that implement the functions of the reception unit 201, the measured value acquisition unit 202, the time synchronization parameter processing unit 203, the abnormality degree comparison unit 204, and the transmission unit 205.

These programs are loaded from the auxiliary storage device 2003 into the main storage device 2002. Then, the processor 2001 executes these programs and performs operation of the reception unit 201, the measured value acquisition unit 202, the time synchronization parameter processing unit 203, the abnormality degree comparison unit 204, and the transmission unit 205 to be described below.

FIG. 8 schematically illustrates a state in which the processor 2001 executes the programs that implement the functions of the reception unit 201, the measured value acquisition unit 202, the time synchronization parameter processing unit 203, the abnormality degree comparison unit 204, and the transmission unit 205.

The communication device 2004 is used for communication with the relay apparatus 10.

The input/output device 2005 includes a mouse, a keyboard, a display, and the like.

In FIG. 7, the reception unit 201 performs the same operation as that of the reception unit 101 of Embodiment 1.

That is, the reception unit 201 receives the frame that includes the measured parameter value of the time synchronization parameter, using the communication device 2004. Then, the reception unit 201 outputs the received frame to the measured value acquisition unit 202.

The measured value acquisition unit 202 performs the same operation as that of the measured value acquisition unit 102 of Embodiment 1.

That is, the measured value acquisition unit 202 extracts from the frame, the measured value (the value of the timestamp) of the time. Further, the measured value acquisition unit 202 acquires the measured value of the propagation delay, the measured value of the clock ratio, and the measured value of the retention time obtained by measurement in a mechanism in the monitoring apparatus 20 which is not illustrated in FIG. 7. Then, the measured value acquisition unit 202 outputs these measured values as the measured parameter values, to the time synchronization parameter processing unit 203 corresponding to each measured value.

The time synchronization parameter processing unit 203 is provided for each time synchronization parameter as with the time synchronization parameter processing unit 103 of Embodiment 1. Further, the time synchronization parameter processing unit 203 performs the same operation as that of the time synchronization parameter processing unit 103 of Embodiment 1.

That is, the time synchronization parameter processing unit 203 calculates the abnormality degree of the time synchronization parameter.

The time synchronization parameter processing unit 203 includes a time synchronization parameter database 2031, a learning unit 2032, an inference unit 2033, a cumulative distribution table generation unit 2034, a cumulative distribution table database 2035, and a cumulative probability calculation unit 2036, as internal configurations.

The time synchronization parameter database 2031 performs the same operation as that of the time synchronization parameter database 1031 of Embodiment 1. A detailed description of the time synchronization parameter database 2031 is omitted.

The learning unit 2032 performs the same operation as that of the learning unit 1032 of Embodiment 1. A detailed description of the learning unit 2032 is omitted.

The inference unit 2033 performs the same operation as that of the inference unit 1033 of Embodiment 1. A detailed description of the inference unit 2033 is omitted.

The inference unit 2033 is equivalent to a parameter value prediction unit. Further, a process performed by the inference unit 2033 is equivalent to a parameter value prediction process.

The cumulative distribution table generation unit 2034 performs the same operation as that of the cumulative distribution table generation unit 1034 of Embodiment 1. A detailed description of the cumulative distribution table generation unit 2034 is omitted.

The cumulative distribution table generation unit 2034 is equivalent to a prediction error calculation unit. Further, a process performed by the cumulative distribution table generation unit 2034 is equivalent to a prediction error calculation process.

The cumulative distribution table database 2035 performs the same operation as that of the cumulative distribution table database 1035 of Embodiment 1. A detailed description of the cumulative distribution table database 2035 is omitted.

The cumulative probability calculation unit 2036 performs the same operation as that of the cumulative probability calculation unit 1036 of Embodiment 1. A detailed description of the cumulative probability calculation unit 2036 is omitted.

The cumulative probability calculation unit 2036 is equivalent to an abnormality degree calculation unit. Further, a process performed by the cumulative probability calculation unit 2036 is equivalent to an abnormality degree calculation process.

Further, a learning model 2037 has the same function as that of the learning model 1037 of Embodiment 1.

The abnormality degree comparison unit 204 performs the same operation as that of the abnormality degree comparison unit 104 of Embodiment 1.

That is, the abnormality degree comparison unit 204 obtains from the time synchronization parameter processing unit 203, the abnormality degree of the time synchronization parameter.

Then, the abnormality degree comparison unit 204 arranges the time synchronization parameters in descending order of the abnormality degree.

Further, the abnormality degree comparison unit 204 notifies the transmission unit 205 of the abnormality degrees of the time synchronization parameters and the order of the time synchronization parameters.

The transmission unit 205 performs the same operation as that of the transmission unit 105 of Embodiment 1.

That is, the transmission unit 205 displays on a display of the input/output device 2005, the abnormality degrees of the time synchronization parameters and the names of the time synchronization parameters in the order notified by the abnormality degree comparison unit 204.

The abnormality degree comparison unit 204 and the transmission unit 205 are equivalent to presentation units.

Description of Operation

In the present embodiment, the monitoring apparatus 20 performs the operation of FIG. 4 in the learning phase.

In the present embodiment, each step of FIG. 4 is implemented by a component of the monitoring apparatus 20 whose name is the same as an operational body (a component of the relay apparatus 10) of each step in Embodiment 1.

Since each step of FIG. 4 is the same as that described in Embodiment 1, a description thereof is omitted.

Further, in the present embodiment, the monitoring apparatus 20 performs the operation of FIG. 5 in the inference phase.

In the present embodiment, each step of FIG. 5 is implemented by a component of the monitoring apparatus 20 whose name is the same as an operational body (a component of the relay apparatus 10) of each step in Embodiment 1.

Since each step of FIG. 5 is the same as that described in Embodiment 1, a description thereof is omitted.

In Embodiment 1, the operation has been described in step S28, in which the transmission unit 105 transmits to the monitoring apparatus 20, the notification data indicating the abnormality degrees of the time synchronization parameters and the names of the time synchronization parameters. This operation is not necessary in the present embodiment.

Description of Effects of Embodiment

As described above, according to the present embodiment, the monitoring apparatus 20 can calculate an abnormality degree of a time synchronization parameter and estimate an abnormality cause.

Embodiment 3

In the present embodiment, differences from Embodiment 1 will be mainly described.

Matters not described below are the same as those in Embodiment 1.

In Embodiment 1, the abnormality degree comparison unit 104 only decides order of time synchronization parameters in the descending order of the abnormality degree. In the present embodiment, the abnormality degree comparison unit 104 assumes that the abnormality is included in the measured parameter value of the time synchronization parameter whose abnormality degree is a maximum. Then, the abnormality degree comparison unit 104 specifies the time synchronization parameter whose abnormality degree is the maximum, as an abnormality inclusion time synchronization parameter. Further, the abnormality degree comparison unit 104 estimates a cause of the abnormality assumed to be included in the measured parameter value of the abnormality inclusion time synchronization parameter.

Description of Configuration

Figure 13:
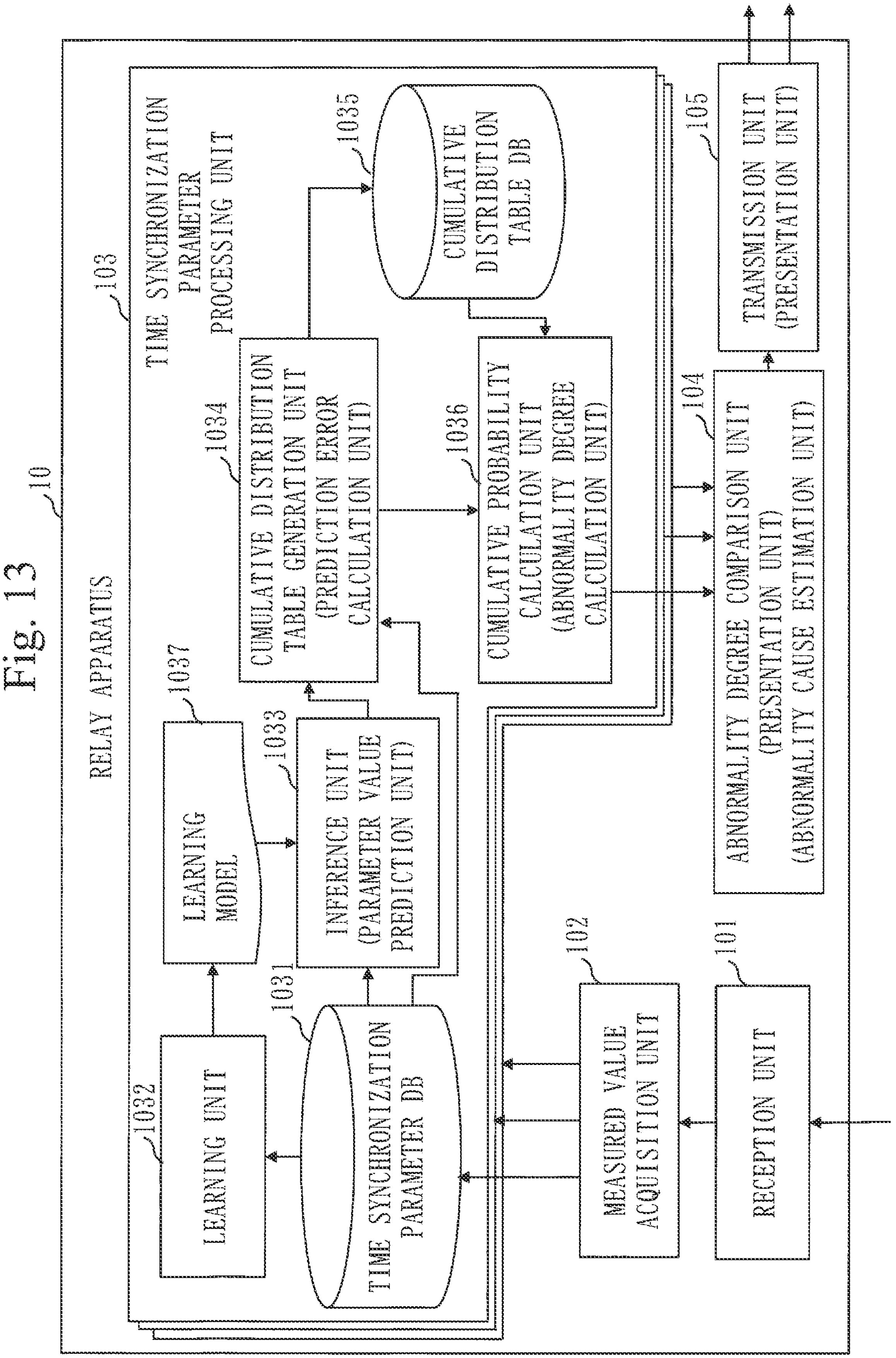
FIG. 13 is a diagram illustrating a functional configuration example of the relay apparatus according to Embodiment 3.

FIG. 13 illustrates a functional configuration example of the relay apparatus 10 according to the present embodiment.

Each component illustrated in FIG. 13 is the same as each component illustrated in FIG. 2. However, in FIG. 13, the abnormality degree comparison unit 104 functions as an abnormality cause estimation unit in addition to the presentation unit. As described above, the abnormality degree comparison unit 104 specifies the time synchronization parameter whose abnormality degree is the maximum as the abnormality inclusion time synchronization parameter, and estimates the cause of the abnormality assumed to be included in the measured parameter value of the abnormality inclusion time synchronization parameter.

Components other than the abnormality degree comparison unit 104 are as described in Embodiment 1

Further, a hardware configuration of the relay apparatus 10 according to the present embodiment are as illustrated in FIG. 3.

Description of Operation

Figure 14:
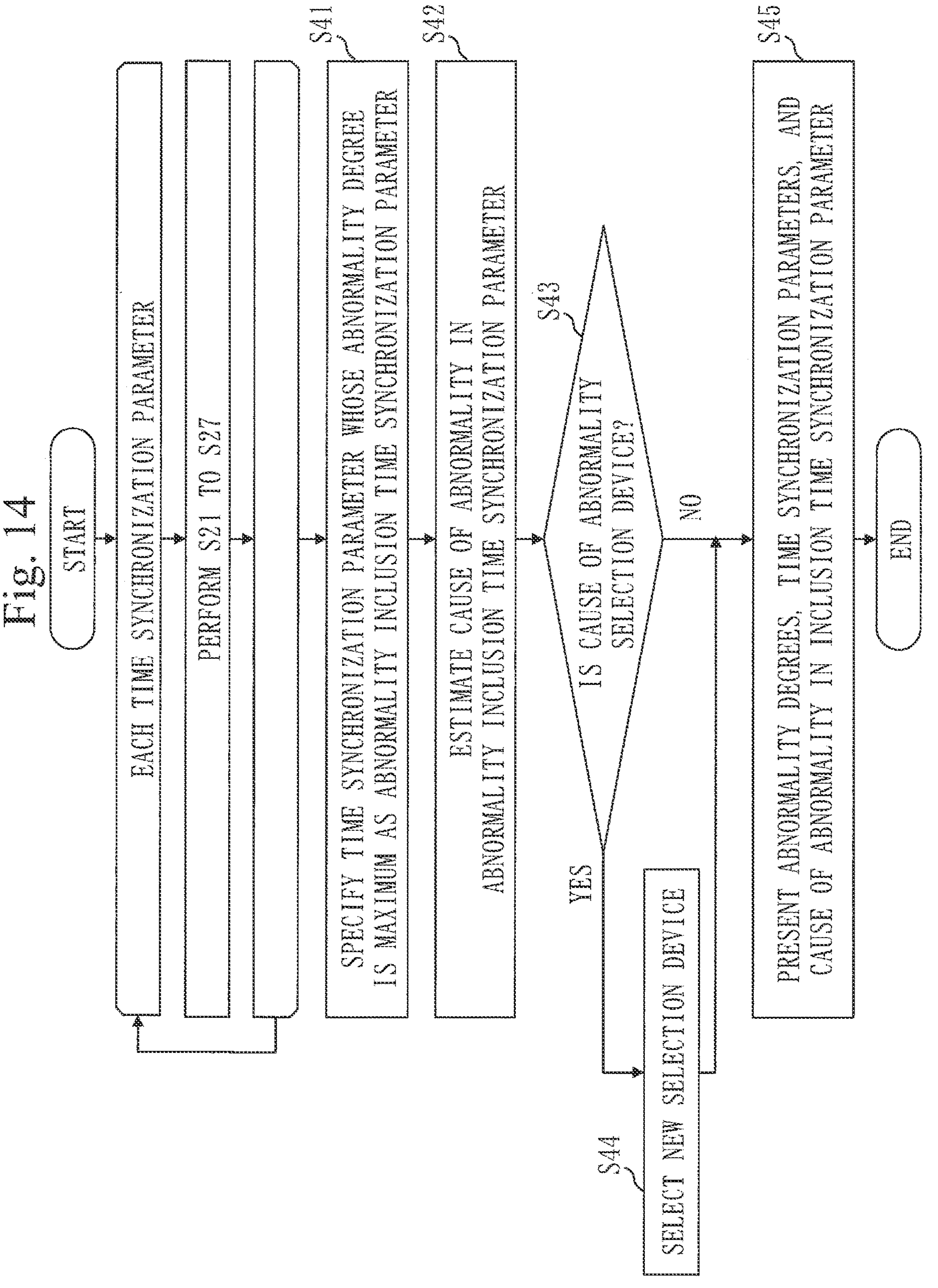
FIG. 14 is a flowchart illustrating an operational example of the relay apparatus in the inference phase according to Embodiment 3.

FIG. 14 illustrates an operational example of the relay apparatus 10 according to the present embodiment in the inference phase.

In the present embodiment, the relay apparatus 10 performs steps S21 to S27 illustrated in FIG. 5 for each time synchronization parameter.

As a result of performing steps S21 to S27 for each time synchronization parameter, the abnormality degree of each time synchronization parameter is calculated.

Next, in step S41, based on an assumption that the abnormality is included in the measured parameter value of the time synchronization parameter whose abnormality degree is the maximum among the plurality of types of time synchronization parameters, the abnormality degree comparison unit 104 specifies the time synchronization parameter whose abnormality degree is the maximum, as the abnormality inclusion time synchronization parameter.

Next, in step S42, the abnormality degree comparison unit 104 estimates the cause of the abnormality assumed to be included in the measured parameter value of the abnormality inclusion time synchronization parameter.

Specifically, when the time in the selection device is specified as the abnormality inclusion time synchronization parameter, the abnormality degree comparison unit 104 estimates that the selection device is the cause of the abnormality.

Further, when the propagation delay between the selection device and the relay apparatus 10 is specified as the abnormality inclusion time synchronization parameter, the abnormality degree comparison unit 104 estimates that either the transmission path from the selection device to the relay apparatus 10 or the relay apparatus 10 itself is the cause of the abnormality.

Further, when the clock ratio between the selection device and the relay apparatus 10 is specified as the abnormality inclusion time synchronization parameter, the abnormality degree comparison unit 104 estimates that either an oscillator in the selection device, an oscillator in the relay apparatus 10, or an oscillator in a communication device included on the transmission path from the selection device to the relay apparatus 10 is the cause of the abnormality.

Further, when the retention time of the communication frame in the selection device is specified as the abnormality inclusion time synchronization parameter, the abnormality degree comparison unit 104 estimates that the selection device is the cause of the abnormality.

When the cause of the abnormality specified in step S42 is not the selection device (NO in step S44), the process proceeds to step S45.

On the other hand, when the cause of the abnormality specified in step S42 is the selection device (YES in step S43), the abnormality degree comparison unit 104 selects a new selection device in step S44.

For example, when the current selection device is the time synchronization device 30, the abnormality degree comparison unit 104 selects as the new selection device, the time synchronization device 40 which is the other device not selected as the selection device.

YES is determined in step S43 in the case where the time in the selection device is specified as the abnormality inclusion time synchronization parameter, and the case where the retention time of the communication frame at the selection device is specified as the abnormality inclusion time synchronization parameter.

After the new selection device is selected in step S44, the process proceeds to step S45.

In step S45, as with Embodiment 1, the transmission unit 105 displays on the display of the input/output device 1005, the abnormality degrees of the time synchronization parameters and the names of the time synchronization parameters in the descending order of the abnormality degree. Further, the transmission unit 105 displays on the display of the input/output device 1005, the cause of the abnormality in the abnormality inclusion time synchronization parameter.

Further, the transmission unit 105 generates notification data indicating the abnormality degrees of the time synchronization parameters and the names of the time synchronization parameters in the descending order of the abnormality degree, and also indicating the cause of the abnormality in the abnormality inclusion time synchronization parameter. Then, the transmission unit 105 transmits the notification data to the monitoring apparatus 20, using the communication device 1004.

As described above, in the present embodiment, when the cause of the abnormality in the time synchronization parameter whose abnormality degree is highest is the selection device (for example, the time synchronization device 30), the relay apparatus 10 stops the time synchronization calculation using the measured parameter values of the selection device. Then, the relay apparatus 10 selects the new selection device (for example, the time synchronization device 40), and performs the time synchronization calculation, using the measured parameter values of the new selection device (for example, the time synchronization device 40).

Further, as a result of calculating the abnormality degree with the measured parameter values of the new selection device (for example, the time synchronization device 40), when the cause of the abnormality in the time synchronization parameter whose abnormality degree is highest is the new selection device (for example, the time synchronization device 40), the abnormality degree comparison unit 104 outputs to the transmission unit 105, an error message for stopping the time synchronization calculation. Then, the transmission unit 105 displays the error message on the display of the input/output device 1005. Furthermore, the transmission unit 105 transmits the error message to the monitoring apparatus 20, using the communication device 1004.

An operational example of the abnormality degree comparison unit 104 in the case where the relay apparatus 10 operates as the information processing apparatus has been described above.

Figure 15:
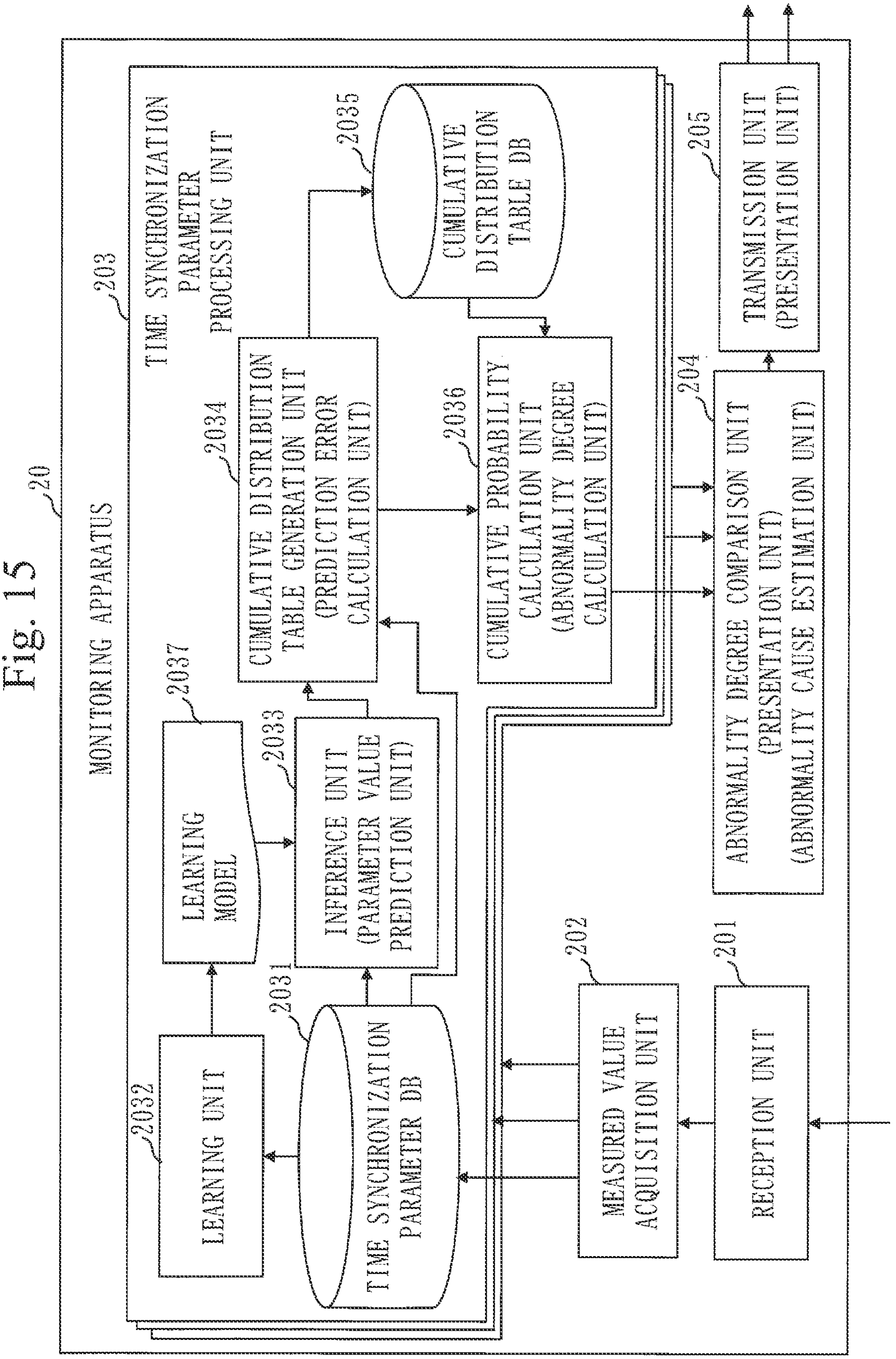
FIG. 15 is a diagram illustrating a functional configuration example of the monitoring apparatus according to Embodiment 3.

As described in Embodiment 2, when the monitoring apparatus 20 operates as the information processing apparatus, the abnormality degree comparison unit 204 performs the above operation of the abnormality degree comparison unit 104. In this case, as illustrated in FIG. 15, the abnormality degree comparison unit 204 functions as an abnormality cause estimation unit in addition to the presentation unit. Each component illustrated in FIG. 15 is the same as each component illustrated in FIG. 7. Further, a hardware configuration of the monitoring apparatus 20 according to the present embodiment is also as illustrated in FIG. 8.

Description of Effects of Embodiment

As described above, in the present embodiment, a time synchronization parameter whose abnormality degree is a maximum is specified as an abnormality inclusion time synchronization parameter, and an abnormality cause in the abnormality inclusion time synchronization parameter is estimated. Therefore, according to the present embodiment, it is possible to accurately estimate the abnormality cause.

Further, in the present embodiment, when the abnormality cause of the abnormality inclusion time synchronization parameter is a selection device, a new selection device is selected. Therefore, according to the present embodiment, it is possible to avoid time synchronization calculation, using a time synchronization parameter of a device where an abnormality has highly likely occurred.

Embodiments 1 to 3 have been described above and two of these embodiments may be implemented in connection.

Alternatively, one of these three embodiments may be implemented partially.

Alternatively, these three embodiments may be implemented partially in connection.

Further, the configurations and procedures described above in these three embodiments may be modified as necessary.

Supplementary Description of Hardware Configurations

Finally, a supplementary description of the hardware configurations of the relay apparatus 10 and the monitoring apparatus 20 will be given.

The processor 1001 illustrated in FIG. 3 is an Integrated Circuit (IC) that performs processing.

The processor 1001 is a Central Processing Unit (CPU), a Digital Signal Processor (DSP), or the like.

The main storage device 1002 illustrated in FIG. 3 is a Random Access Memory (RAM).

The auxiliary storage device 1003 illustrated in FIG. 3 is a Read Only Memory (ROM), a flash memory, a Hard Disk Drive (HDD), or the like.

The communication device 1004 illustrated in FIG. 3 is an electronic circuit that executes a communication process for data.

The communication device 1004 is, for example, a communication chip or a Network Interface Card (NIC).

Further, the auxiliary storage device 1003 also stores an Operating System (OS).

Then, at least a part of the OS is executed by the processor 1001.

While executing at least the part of the OS, the processor 1001 executes programs that implement functions of the reception unit 101, the measured value acquisition unit 102, the time synchronization parameter processing unit 103, the abnormality degree comparison unit 104, and the transmission unit 105.

By the processor 1001 executing the OS, task management, memory management, file management, communication control, and the like are performed.

Further, at least one of information, data, a signal value, and a variable value that indicate results of processes of the reception unit 101, the measured value acquisition unit 102, the time synchronization parameter processing unit 103, the abnormality degree comparison unit 104, and the transmission unit 105 is stored at least one of the main storage device 1002, the auxiliary storage device 1003, and a register and a cache memory in the processor 1001.

Further, the programs that implement the functions of the reception unit 101, the measured value acquisition unit 102, the time synchronization parameter processing unit 103, the abnormality degree comparison unit 104, and the transmission unit 105 may be stored in a portable recording medium such as a magnetic disk, a flexible disk, an optical disc, a compact disc, a Blu-ray (registered trademark) disc, or a DVD. Then, the portable recording medium storing the programs that implement the functions of the reception unit 101, the measured value acquisition unit 102, the time synchronization parameter processing unit 103, the abnormality degree comparison unit 104, and the transmission unit 105 may be distributed.

Further, the "unit" of each of the reception unit 101, the measured value acquisition unit 102, the time synchronization parameter processing unit 103, the abnormality degree comparison unit 104, and the transmission unit 105 may be read as a "circuit", "step", "procedure", "process", or "circuitry".

Further, the relay apparatus 10 may be implemented by a processing circuit. The processing circuit is, for example, a logic Integrated Circuit (IC), a Gate Array (GA), an Application Specific Integrated Circuit (ASIC), or a Field-Programmable Gate Array (FPGA).

In this case, each of the reception unit 101, the measured value acquisition unit 102, the time synchronization parameter processing unit 103, the abnormality degree comparison unit 104, and the transmission unit 105 is implemented as a part of the processing circuit.

The processor 2001 illustrated in FIG. 8 is also an IC that performs processing.

The processor 2001 is also a CPU, a DSP, or the like.

The main storage device 2002 illustrated in FIG. 8 is also an RAM.

The auxiliary storage device 2003 illustrated in FIG. 8 is also an ROM, a flash memory, an HDD, or the like.

The communication device 2004 illustrated in FIG. 8 is also an electronic circuit that executes a communication process for data.

The communication device 2004 is also, for example, a communication chip or an NIC.

Further, the auxiliary storage device 2003 also stores an OS.

Then, at least a part of the OS is executed by the processor 2001.

While executing at least the part of the OS, the processor 2001 executes programs that implement functions of the reception unit 201, the measured value acquisition unit 202, the time synchronization parameter processing unit 203, the abnormality degree comparison unit 204, and the transmission unit 205.

By the processor 2001 executing the OS, task management, memory management, file management, communication control, and the like are performed.

Further, at least one of information, data, a signal value, and a variable value that indicate results of processes of the reception unit 201, the measured value acquisition unit 202, the time synchronization parameter processing unit 203, the abnormality degree comparison unit 204, and the transmission unit 205 is stored in at least one of the main storage device 2002, the auxiliary storage device 2003, and a register and a cache memory in the processor 2001.

Further, the programs that implement the functions of the reception unit 201, the measured value acquisition unit 202, the time synchronization parameter processing unit 203, the abnormality degree comparison unit 204, and the transmission unit 205 may be stored in a portable recording medium such as a magnetic disk, a flexible disk, an optical disc, a compact disc, a Blu-ray (registered trademark) disc, or a DVD. Then, the portable recording medium storing the programs that implement the functions of the reception unit 201, the measured value acquisition unit 202, the time synchronization parameter processing unit 203, the abnormality degree comparison unit 204, and the transmission unit 205 may be distributed.

Further, the "unit" of each of the reception unit 201, the measured value acquisition unit 202, the time synchronization parameter processing unit 203, the abnormality degree comparison unit 204, and the transmission unit 205 may be read as a "circuit", "step", "procedure", "process", or "circuitry".

Further, the monitoring apparatus 20 may be implemented by a processing circuit. The processing circuit is, for example, a logic IC, a GA, an ASIC, or an FPGA.

In this case, each of the reception unit 201, the measured value acquisition unit 202, the time synchronization parameter processing unit 203, the abnormality degree comparison unit 204, and the transmission unit 205 is implemented as a part of the processing circuit.

In the present description, a superordinate concept of the processor and the processing circuit is referred to as "processing circuitry".

That is, each of the processor and the processing circuit is a specific example of the "processing circuitry".

REFERENCE SIGNS LIST

10: relay apparatus; 20: monitoring apparatus; 30: time synchronization device; 40: time synchronization device; 50: time synchronization system; 101: reception unit; 102: measured value acquisition unit; 103: time synchronization parameter processing unit; 104: abnormality degree comparison unit; 105: transmission unit; 1001: processor; 1002: main storage device; 1003: auxiliary storage device; 1004: communication device; 1005: input/output device; 1031: time synchronization parameter database; 1032: learning unit; 1033: inference unit; 1034: cumulative distribution table generation unit; 1035: cumulative distribution table database; 1036: cumulative probability calculation unit; 1037: learning model; 201: reception unit; 202: measured value acquisition unit; 203: time synchronization parameter processing unit; 204: abnormality degree comparison unit; 205: transmission unit; 2001: processor; 2002: main storage device; 2003: auxiliary storage device; 2004: communication device; 2005: input/output device; 2031: time synchronization parameter database; 2032: learning unit; 2033: inference unit; 2034: cumulative distribution table generation unit; 2035: cumulative distribution table database; 2036: cumulative probability calculation unit; 2037: learning model.

The invention claimed is:

1. An information processing apparatus comprising:
processing circuitry:
to predict as a prediction parameter value, a future parameter value of each of a plurality of types of time synchronization parameters each of which is used for time synchronization calculation which is calculation for synchronizing times of two devices;
when a measured parameter value which is a measured value corresponding to the prediction parameter value is generated with elapse of time, to calculate as a prediction error, a difference between the measured parameter value and the prediction parameter value, for each of the time synchronization parameters;
to calculate an abnormality degree indicating possibility that an abnormality is included in the measured parameter value, using the prediction error, for each of the time synchronization parameters; and
to present the plurality of types of time synchronization parameters in descending order of the abnormality degree, wherein
the abnormality degree is a cumulative probability of the prediction error.

2. The information processing apparatus according to claim 1, wherein
the processing circuitry emphatically presents a time synchronization parameter whose abnormality degree is equal to or greater than a threshold value, among the plurality of types of time synchronization parameters.

3. An information processing apparatus comprising:
processing circuitry:
to predict as a prediction parameter value, a future parameter value of each of a plurality of different types of time synchronization parameters each of which is used for time synchronization calculation which is calculation for synchronizing times of two devices; and
when a measured parameter value which is a measured value corresponding to the prediction parameter value is generated with elapse of time, to calculate as a prediction error, a difference between the measured parameter value and the prediction parameter value, for each of the different types of time synchronization parameters; wherein
the measured parameter value of each of the different types of time synchronization parameters is generated at a generation timing that repeatedly arrives, and
the processing circuitry predicts for each of the different types of time synchronization parameters, n ($n \geq 1$) prediction parameter values of n future generation timings, based on m ($m \geq 1$) measured parameter values of m past generation timings, using a learning model obtained by machine learning.

4. The information processing apparatus according to claim 3, wherein
the processing circuitry calculates as the prediction error, a mean absolute error between the n prediction parameter values and n measured parameter values obtained with elapse of time and corresponding to the n prediction parameter values, for each of time synchronization parameters, and the processing circuitry calculates for each of time synchronization parameters, an abnormality degree indicating possibility that at least one measured parameter value among the n measured parameter values is an abnormality value, using the prediction error.

5. The information processing apparatus according to claim 1, wherein the information processing apparatus is connected to the two devices through a network, and each of the time synchronization parameters is either a time in a selection device which is one device selected from the two devices, a propagation delay between the selection device and the information processing apparatus, a clock ratio between the selection device and the information processing apparatus, or a retention time of a communication frame in the selection device.

6. The information processing apparatus according to claim 3, wherein the information processing apparatus is connected to the two devices through a network, and each of the time synchronization parameters is either a time in a selection device which is one device selected from the two devices, a propagation delay between the selection device and the information processing apparatus, a clock ratio between the selection device and the information processing apparatus, or a retention time of a communication frame in the selection device.

7. An information processing apparatus comprising:

processing circuitry:

to predict as a prediction parameter value, a future parameter value of each of a plurality of types of time synchronization parameters each of which is used for time synchronization calculation which is calculation for synchronizing times of two devices;

when a measured parameter value which is a measured value corresponding to the prediction parameter value is generated with elapse of time, to calculate as a prediction error, a difference between the measured parameter value and the prediction parameter value, for each of the time synchronization parameters;

to calculate an abnormality degree indicating possibility that an abnormality is included in the measured parameter value, using the prediction error, for each of the time synchronization parameters; and to specify a time synchronization parameter having the maximum abnormality degree as an abnormality inclusion time synchronization parameter, based on an assumption that an abnormality is included in a measured parameter value of a time synchronization parameter having the maximum abnormality degree among the plurality of types of time synchronization parameters, and to estimate a cause of the abnormality assumed to be included in the measured parameter value of the abnormality inclusion time synchronization parameter, wherein the abnormality degree is a cumulative probability of the prediction error.

8. The information processing apparatus according to claim 7, wherein the information processing apparatus is connected to the two devices through a network, the plurality of types of time synchronization parameters includes a time in a selection device which is one device selected from the two devices, a propagation delay between the selection device and the information processing apparatus, a clock ratio between the selection device and the information processing apparatus, and a retention time of a communication frame in the selection device, when the time in the selection device is specified as the abnormality inclusion time synchronization parameter, the processing circuitry estimates that the selection device is the cause of the abnormality, when the propagation delay between the selection device and the information processing apparatus is specified as the abnormality inclusion time synchronization parameter, the processing circuitry estimates that either a transmission path from the selection device to the information processing apparatus or the information processing apparatus itself is the cause of the abnormality, when the clock ratio between the selection device and the information processing apparatus is specified as the abnormality inclusion time synchronization parameter, the processing circuitry estimates that either an oscillator in the selection device, an oscillator in the information processing apparatus, or an oscillator in a communication device included in the transmission path from the selection device to the information processing apparatus is the cause of the abnormality, and when the retention time of the communication frame in the selection device is specified as the abnormality inclusion time synchronization parameter, the processing circuitry estimates that the selection device is the cause of the abnormality.

9. The information processing apparatus according to claim 8, wherein when the selection device is estimated to be the cause of the abnormality, the processing circuitry selects as a new selection device, another device which has not been selected as the selection device among the two devices.

10. The information processing apparatus according to claim 1, wherein the information processing apparatus is a relay apparatus that relays between the two devices, a communication frame to be communicated between the two devices for the time synchronization calculation.

11. The information processing apparatus according to claim 3, wherein the information processing apparatus is a relay apparatus that relays between the two devices, a communication frame to be communicated between the two devices for the time synchronization calculation.

12. The information processing apparatus according to claim 7, wherein the information processing apparatus is a relay apparatus that relays between the two devices, a communication frame to be communicated between the two devices for the time synchronization calculation.

13. The information processing apparatus according to claim 1, wherein the information processing apparatus is a monitoring apparatus that monitors communication between the two devices.

14. The information processing apparatus according to claim 3, wherein the information processing apparatus is a monitoring apparatus that monitors communication between the two devices.

15. The information processing apparatus according to claim 7, wherein the information processing apparatus is a monitoring apparatus that monitors communication between the two devices.

16. An information processing method comprising:

predicting as a prediction parameter value, a future parameter value of each of a plurality of types of time synchronization parameters each of which is used for time synchronization calculation which is calculation for synchronizing times of two devices;

when a measured parameter value which is a measured value corresponding to the prediction parameter value is generated with elapse of time, calculating as a prediction error, a difference between the measured parameter value and the prediction parameter value, for each of the time synchronization parameters;

calculating an abnormality degree indicating possibility that an abnormality is included in the measured parameter value, using the prediction error, for each of the time synchronization parameters; and presenting the plurality of types of time synchronization parameters in descending order of the abnormality degree, wherein the abnormality degree is a cumulative probability of the prediction error.

17. A non-transitory computer readable medium storing an information processing program causing a computer to execute:

a parameter value prediction process to predict as a prediction parameter value, a future parameter value of each of a plurality of types of time synchronization parameters each of which is used for time synchronization calculation which is calculation for synchronizing times of two devices;

a prediction error calculation process, when a measured parameter value which is a measured value corresponding to the prediction parameter value is generated with elapse of time, to calculate as a prediction error, a difference between the measured parameter value and the prediction parameter value, for each of the time synchronization parameters;

an abnormality degree calculation process to calculate an abnormality degree indicating possibility that an abnormality is included in the measured parameter value, using the prediction error, for each of the time synchronization parameters; and a presentation process to present the plurality of types of time synchronization parameters in descending order of the abnormality degree, wherein the abnormality degree is a cumulative probability of the prediction error.

* * * * *